(12) United States Patent
Wakita et al.

(10) Patent No.: US 8,815,446 B2
(45) Date of Patent: Aug. 26, 2014

(54) ANODE MATERIAL, ANODE AND BATTERY, AND METHODS OF MANUFACTURING THEM

(75) Inventors: Shinya Wakita, Fukushima (JP); Izaya Okae, Fukushima (JP)

(73) Assignee: Sony Corporation, Tokyo (JP)

( * ) Notice: Subject to any disclaimer, the term of this patent is extended or adjusted under 35 U.S.C. 154(b) by 977 days.

(21) Appl. No.: 12/141,588

(22) Filed: Jun. 18, 2008

(65) Prior Publication Data

US 2009/0011333 A1 Jan. 8, 2009

(30) Foreign Application Priority Data

Jul. 6, 2007 (JP) .................................. 2007-178365

(51) Int. Cl.
*H01M 4/13* (2010.01)

(52) U.S. Cl.
USPC ....................................................... 429/218.1

(58) Field of Classification Search
USPC .............................................. 429/218.1, 220
See application file for complete search history.

(56) References Cited

U.S. PATENT DOCUMENTS

| | | | |
|---|---|---|---|
| 4,950,566 A | 8/1990 | Huggins et al. | |
| 5,427,875 A * | 6/1995 | Yamamoto et al. | 429/223 |
| 6,337,159 B1 * | 1/2002 | Peled et al. | 429/231.4 |
| 6,391,495 B1 | 5/2002 | Choi et al. | |
| 6,896,706 B2 | 5/2005 | Lee et al. | |
| 7,108,944 B2 | 9/2006 | Kweon et al. | |
| 2003/0190530 A1 * | 10/2003 | Yang et al. | 429/326 |
| 2005/0042515 A1 * | 2/2005 | Hwang et al. | 429/231.95 |
| 2006/0068292 A1 * | 3/2006 | Mizutani et al. | 429/231.8 |
| 2006/0093918 A1 * | 5/2006 | Howard et al. | 429/231.95 |
| 2006/0269659 A1 | 11/2006 | Kweon et al. | |
| 2006/0292444 A1 * | 12/2006 | Chiang et al. | 429/218.1 |
| 2007/0264575 A1 * | 11/2007 | Wakita et al. | 429/232 |
| 2008/0003503 A1 * | 1/2008 | Kawakami et al. | 429/231.5 |
| 2008/0160415 A1 * | 7/2008 | Wakita et al. | 429/231.5 |

FOREIGN PATENT DOCUMENTS

| | | | | |
|---|---|---|---|---|
| JP | 09-147864 | 6/1997 | | |
| JP | 09-204936 | 8/1997 | | |
| JP | 2000-164218 | 6/2000 | | |
| JP | 2001043858 A * | 2/2001 | .............. | H01M 4/58 |
| JP | 2003-100296 | 4/2003 | | |
| JP | 2003-217593 | 7/2003 | | |
| JP | 2003-249219 | 9/2003 | | |
| JP | 2004-511422 | 4/2004 | | |
| JP | 2004-146296 | 5/2004 | | |
| KR | 100497251 | 6/2005 | | |

OTHER PUBLICATIONS

JP2001-043858A Machine English Translation.*

(Continued)

*Primary Examiner* — Patrick Ryan
*Assistant Examiner* — Lucas J O'Donnell
(74) *Attorney, Agent, or Firm* — K&L Gates LLP

(57) ABSTRACT

A battery capable of improving the cycle characteristics while securing the input and output characteristics is provided. The battery includes a cathode, an anode, and an electrolytic solution. The anode has an anode active material layer on an anode current collector. The anode active material layer contains an anode material having a plurality of covering particles on a surface of an anode active material capable of intercalating and deintercalating an electrode reactant. The plurality of covering particles contain at least one of an alkali metal salt and an alkali earth metal salt.

34 Claims, 10 Drawing Sheets

(56) References Cited

OTHER PUBLICATIONS

English machine translation of JP2001-043858A to Aoki.*

Japanese Patent Office, Notification of reasons for refusal issued in connection with Japanese Patent Application No. 2007-178365, dated Jul. 3, 2012. (8 pages).

Japanese Patent Office, Notification of reasons for refusal issued in connection with Japanese Patent Application No. 2007-178365, dated Sep. 18, 2012. (2 pages).

Korean Intellectual Property Office, Notice of Reasons for Preliminary Rejection issued in connection with Korean Patent Application No. 10-2008-0063561, dated May 30, 2014. (10 pages).

* cited by examiner

ANODE MATERIAL, ANODE AND BATTERY, AND METHODS OF MANUFACTURING THEM

CROSS REFERENCES TO RELATED APPLICATIONS

The present application claims priority to Japanese Patent Application JP 2007-178365 filed in the Japanese Patent Office on Jul. 6, 2008, the entire contents of which being incorporated herein by reference.

BACKGROUND

The present application relates to an anode material having an anode active material, an anode and a battery using it, and methods of manufacturing them.

In recent years, portable electronic devices such as combination cameras (videotape recorder), mobile phones, and notebook personal computers have been widely used, and it is strongly demanded to reduce their size and weight and to achieve their long life. Accordingly, as a power source for the portable electronic devices, a battery, in particular a lightweight secondary batter capable of providing a high energy density has been developed. Specially, a secondary battery using intercalation and deintercalation of lithium for charge and discharge reaction (so-called lithium ion secondary battery) is extremely prospective, since such a secondary battery provides a higher energy density compared to a lead battery and a nickel cadmium battery.

The lithium ion secondary battery has a cathode, an anode, and an electrolytic solution. The anode has an anode active material layer on an anode current collector. As an anode active material in the anode active material layer, a carbon material such as graphite has been widely used.

In the case that the carbon material is used as an anode active material, further improvement of the battery capacity is an issue, since the battery capacity already reaches the level close to the theoretical capacity. To solve such an issue, the following technique has been proposed (for example, refer to Japanese Unexamined Patent Application Publication No. 09-204936). In the technique, by increasing the thickness of the anode active material layer, the occupancy ratio of the anode active material layer in the battery is relatively increased to the occupancy ratios of the anode current collector and the separator. In the specification, such a technique in which the thickness of the anode active material layer is intentionally increased to achieve a high capacity is referred to as "thickening of the anode active material layer."

The technique of thickening of the anode active material layer is useful to improve the battery capacity. On the other hand, the technique causes a new issue. Specifically, when design is made so that the thickness of the anode active material layer is increased while the material and the density thereof are maintained as before under a constant battery volume, the occupancy ratio of the anode current collector in the battery is decreased, and the anode active material amount formed per unit area of the anode current collector is increased. Thus, when the same electric capacity is charged and discharged, the current density of the anode is relatively increased. Therefore, in the anode, intercalation (insertion) and deintercalation (extraction) of lithium ions are not sufficiently generated. In some cases, lithium is precipitated, becomes a dendrite, and loses its activity. In the result, input and output characteristics of the lithium ions in charge and discharge are lowered. Further, when charge and discharge are repeated, the discharge capacity is largely lowered, and thus the cycle characteristics are also lowered.

The foregoing issue similarly occurs in the case that the volume density of the anode active material layer is increased to obtain a high battery capacity as well, in addition to the case that thickening of the anode active material layer is implemented. This is because when the volume density of the anode active material layer is increased, gaps where the lithium ions are moved become small, and thus the transfer rate of the lithium ions in charge becomes slow. In the specification, such a technique to intentionally increase the volume density of the anode active material layer to achieve a high capacity is referred to as "increase of the volume density of the anode active material layer."

In recent years, as the high performance and the multi functions of the portable electronic devices are developed, further improvement of the battery capacity is demanded. Thus, it has been considered to use silicon, tin or the like instead of the carbon material (for example, refer to U.S. Pat. No. 4,950,566). Since the theoretical capacity of silicon (4199 mAh/g) and the theoretical capacity of tin (994 mAh/g) are significantly higher than the theoretical capacity of graphite (372 mAh/g), it is prospected that the battery capacity is thereby highly improved.

When silicon or the like with the high theoretical capacity is used as an anode active material, the battery capacity is improved. On the other hand, when lithium ions are intercalated, the anode active material becomes highly activated. Thus, the electrolytic solution is easily decomposed. Accordingly, when charge and discharge are repeated, the cycle characteristics are lowered as in the case of thickening of the anode active material layer and increase of the volume density of the anode active material layer with the use of the carbon material as an anode active material.

To improve the input and output characteristics and the cycle characteristics, various techniques have been already proposed. Specifically, a technique to provide a carbon shell added with all alkali metal element or an alkali earth metal element on a crystalline graphite core in the case that a carbon material is used as an anode active material (for example, refer to Japanese Unexamined Patent Application Publication No. 2000-164218), a technique to provide a surface treatment layer containing a coating element-containing compound such as hydroxide and an electrical conductor on the surface of the anode active material (for example, refer to Japanese Unexamined Patent Application Publication No. 2003-100296), and a technique to provide a thin film made of a metal or a metal oxide on the surface of the anode active material (for example, refer to Japanese Unexamined Patent Application Publication No. 2003-249219) are known.

SUMMARY

The high performance and the multi functions of the recent portable electronic devices tend to be increasingly developed. Thus, further improvement of the input and output characteristics and the cycle characteristics of the secondary batteries is aspired. In particular, in the case that a carbon material is used as an anode active material, it is important to improve the input and output characteristics and the cycle characteristics even if thickening of the anode active material layer and increase of the volume density of the anode active material layer are implemented. Meanwhile, in the case that silicon or the like with the high theoretical capacity is used as an anode active material, it is important that the cycle characteristics are improved while the input and output characteristics are maintained.

In view of the foregoing, it is desirable to provide an anode material capable of improving the cycle characteristics while securing the input and output characteristics, an anode and a battery, and methods of manufacturing them.

According to an embodiment, there is provided an anode material including a plurality of covering particles on a surface of an anode active material capable of intercalating and deintercalating an electrode reactant, in which the plurality of covering particles contain at least one of an alkali metal salt and an alkali earth metal salt. According to an embodiment, there is provided a method of manufacturing an anode material having a plurality of covering particles on a surface of an anode active material capable of intercalating and deintercalating an electrode reactant, in which at least one of an alkali metal salt and an alkali earth metal salt is dissolved and then precipitated on the surface of the anode active material to form the plurality of covering particles.

According to an embodiment, there is provided an anode including an anode active material layer on an anode current collector, in which the anode active material layer contains an anode material having a plurality of covering particles on a surface of an anode active material capable of intercalating and deintercalating an electrode reactant, and the plurality of covering particles contain at least one of an alkali metal salt and an alkali earth metal salt. According to an embodiment, there is provided a method of manufacturing an anode having an anode active material layer on an anode current collector in which the anode active material layer contains an anode material having a plurality of covering particles on a surface of an anode active material capable of intercalating and deintercalating an electrode reactant. At least one of an alkali metal salt and an alkali earth metal salt is dissolved and then precipitated on the surface of the anode active material to form the plurality of covering particles.

According to an embodiment, there is provided a battery including a cathode, an anode, and an electrolytic solution. The anode has an anode active material layer on an anode current collector, the anode active material layer contains an anode material having a plurality of covering particles on a surface of an anode active material capable of intercalating and deintercalating an electrode reactant, and the plurality of covering particles contain at least one of an alkali metal salt and an alkali earth metal salt. According to an embodiment, there is provided a method of manufacturing a battery having a cathode, an anode, and an electrolytic solution, in which the anode has an anode active material layer on an anode current collector, and the anode active material layer contains an anode material having a plurality of covering particles on a surface of an anode active material capable of intercalating and deintercalating an electrode reactant. At least one of an alkali metal salt and an alkali earth metal salt is dissolved and then precipitated on the surface of the anode active material to form the plurality of covering particles.

According to the anode material and the method of manufacturing it of the embodiments, the plurality of covering particles containing at least one of the alkali metal salt and the alkali earth metal salt are formed on the surface of the anode active material capable of intercalating and deintercalating the electrode reactant. Thus, intercalation and de-intercalation of the electrode reactant are easily generated in the anode active material, and the chemical stability of the anode active material is improved. Thereby, according to the anode material, the anode or the battery using the method of manufacturing the anode material, or the method of manufacturing the anode or the battery, the electrode reactant is smoothly intercalated and deintercalated in electrode reaction, and decomposition reaction of the electrolytic solution is inhibited. Thus, the cycle characteristics may be improved while the input and output characteristics are secured.

Additional features and advantages are described herein, and will be apparent from the following Detailed Description and the figures.

DETAILED DESCRIPTION

Embodiments will be hereinafter described in detail with reference to the drawings.

First Embodiment

Figure 1:
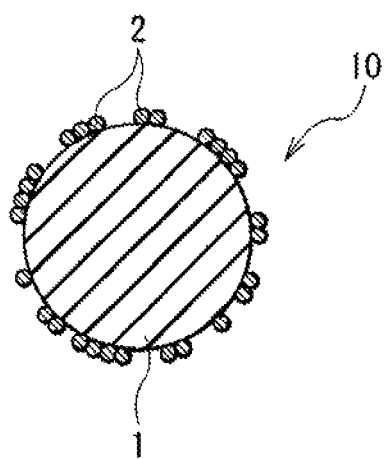
FIG. 1 is a cross section schematically showing a structure of an anode material according to a first embodiment.

FIG. 1 schematically shows a cross sectional structure of an anode material according to a first embodiment. An anode material 10 is used, for example, for an electrochemical device including an anode such as a battery. The anode material 10 has an anode active material 1 capable of intercalating and deintercalating an electrode reactant and a plurality of covering particles 2 provided thereon.

The anode active material 1 contains one or more materials capable of intercalating and deintercalating an electrode reactant, and for example, contains a carbon material. In the carbon material, a change in crystal structure in electrode reaction (in intercalation and deintercalation of the electrode reactant) is extremely small, and thereby a high energy density is obtained. The type of electrode reactant may be voluntarily selected. For example, in the case that the anode material is used for a lithium ion secondary battery, the electrode reactant is lithium.

As the carbon material, for example, graphite, non-graphitizable carbon, graphitizable carbon and the like are cited. More specifically, pyrolytic carbons, coke, glassy carbon fiber, an organic polymer compound fired body, activated carbon, carbon black or the like is cited. Of the foregoing, the coke includes pitch coke, needle coke, petroleum coke and the like. The organic polymer compound fired body is obtained by firing and carbonizing a phenol resin, a furan resin or the like at an appropriate temperature. One of the carbon materials may be used singly, or a plurality thereof may be used by mixture. The shape of the carbon material may be any of a fibrous shape, a spherical shape, a granular shape, and a scale-like shape.

Specially, as the carbon material, graphite is preferable, since the electrochemical equivalent is large and thus a higher energy density is thereby obtained. In particular, natural graphite is preferable to artificial graphite, since a higher energy density is thereby obtained.

As the graphite, graphite in which the lattice spacing $d_{002}$ in the C-axis direction measured by X-ray diffraction method is 0.340 nm or less is preferable, and graphite in which the lattice spacing $d_{002}$ in the C-axis direction measured by X-ray diffraction method is in the range from 0.335 nm to less than 0.338 nm is more preferable, since a higher energy density is thereby obtained.

As the non-graphitizable carbon, the non-graphitizable carbon in which the lattice spacing $d_{002}$ in the C-axis direction measured by X-ray diffraction method is 0.37 nm or more, the real density is less than 1.70 g/cm$^3$, and no exothermic peak is observed at 700 deg C. or more based on Differential Thermal Analysis (DTA) in the air is preferable, since a higher energy density is thereby obtained.

The foregoing lattice spacing $d_{002}$ may be measured by X-ray diffraction method in which, for example, CuKα-ray and high purity silicon are respectively used as an X-ray and a standard material.

Other conditions such as the specific surface area of the carbon material may be voluntarily set according to the usage purpose, the demanded performance and the like of the anode material.

The plurality of covering particles 2 contain at least one of an alkali metal salt and an alkali earth metal salt. When the anode material has the covering particles 2, intercalation and de-intercalation of the electrode reactant are easily generated in the anode active material 1, and the chemical stability of the anode active material 1 is improved. The former action contributes to easy electrode reaction even if the anode current density of the anode is increased. The latter action contributes to hard reaction between the anode active material 1 and other material even if the anode active material 1 becomes highly active in electrode reaction. Such other material is, for example, an electrolytic solution in the case that the anode material is used for the lithium ion secondary battery.

The type of alkali metal is not particularly limited as long as an alkali metal is a Group 1A element in the short period periodic table. Specially, lithium, sodium, or potassium is preferable. The type of alkali earth metal is not particularly limited as long as an alkali earth metal is a Group 2A element in the short period periodic table. Specially, magnesium or calcium is preferable, since both the elements provide sufficient effects. The alkali metal and the alkali earth metal may be used singly, or a plurality thereof may be used by mixture.

The types of alkali metal salt and alkali earth metal salt are not particularly limited. Specially, a chloride salt, a carbonate, or a hydrosulfate is preferable, since sufficient effects are thereby obtained. Such a chloride salt and the like may be used singly, or a plurality thereof may be used by mixture.

Specific examples of the alkali metal salt are as follows. As the chloride salt, lithium chloride, sodium chloride, potassium chloride or the like is cited. As the carbonate, lithium carbonate, sodium carbonate, potassium carbonate or the like is cited. As the hydrosulfate, lithium sulfate ($Li_2SO_4$), sodium sulfate ($Na_2SO_4$), potassium sulfate ($K_2SO_4$) or the like is cited.

Of the alkali earth metal salts, as the carbonate, for example, magnesium carbonate, calcium carbonate and the like are cited.

It is enough that the plurality of covering particles 2 exist on at least part of the surface of the anode active material 1. That is, the plurality of covering particles 2 may exist on part of the surface of the anode active material 1 or on all of the surface of the anode active material 1. In this case, it is possible that the plurality of covering particles 2 form an aggregation and thereby the film-like aggregation covers at least part of the surface of the anode active material 1. It is needless to say that the foregoing aspects of the covering particles 2 may be mixed. FIG. 1 shows a case that the plurality of covering particles 2 form a single layer structure. However, the plurality of covering particles 2 may be layered on the anode active material 1 to form a lamination structure. In this case, the total thickness (so-called film thickness) of the covering particles 2 may be uniform or may be changed.

The ratio of the plurality of covering particles 2 to the anode active material 1 may be voluntarily set, but is preferably in the range from 0.1 wt % to 10 wt %. Thereby, intercalation and de-intercalation of the electrode reactant are easily generated, and the chemical stability of the anode active material 1 is further improved. More specifically, if the ratio is smaller than 0.1 wt %, the number of the covering particles 2 is excessively small, and in the result there is a possibility that intercalation and de-intercalation of the electrode reactant are not sufficiently generated and the chemical stability of the anode active material 1 is not sufficiently improved. Meanwhile, if the ratio is larger than 10 wt %, the number of the covering particles 2 is excessively large and the internal resistance is increased, and in the result there is a possibility that sufficient input and output characteristics are not obtained. The foregoing "ratio of the plurality of covering particles 2 to the anode active material 1" indicates the ratio of the weight of the plurality of covering particles 2 to the weight of the anode active material 1, and is expressed as (weight of the plurality of covering particles 2/weight of the anode active material 1)×100.

The ratio of the plurality of covering particles 2 to the anode active material 1 may be calculated, for example, based on the weight of the anode active material 1 on which the covering particles 2 are provided and the weight of the anode active material 1 measured after the covering particles 2 are dissolved and removed in the case that the covering particles 2 show the solubility.

To easily explain the structure of the anode active material 1 and the plurality of covering particles 2, FIG. 1 schematically shows the structure. The shape, the particle diameter, the number and the like of the anode active material 1 and the covering particles 2 may be voluntarily set, and are not limited to the aspect shown in FIG. 1.

The structure of the anode material 10 shown in FIG. 1 (structure in which the plurality of covering particles 2 exist on the surface of the anode active material 1) may be identified by element analysis (depth direction analysis) with the use of, for example, X-ray Electron Spectroscopy for Chemical Analysis (ESCA). When the foregoing element analysis by ESCA is performed, some amount of impurity and the like may be mixed in the anode active material 1 or the covering particles 2. In this case, the structure of the anode material 10 may be also identified by ESCA. This is because in the element analysis by ESCA, the carbon material is supposed to be measured as a rich region for the anode active material 1, and the alkali metal salt and the like are supposed to be measured as a rich region for the covering particles 2.

The anode material may be manufactured by, for example, by the following procedure.

First, a treated solution in which at least one powder of the alkali metal salt and the alkali earth metal salt (hereinafter also simply referred to as "alkali metal salt and the like") is dissolved is prepared. The type of solvent is not particularly limited. However, in the case that the anode material is used for a nonaqueous solvent-based electrochemical device, to prevent the covering particles 2 from being dissolved and separated from the anode active material 1, water is more preferably used as a solvent than a nonaqueous solvent. Subsequently, the anode active material 1 is dipped in the treated solution. After that, the treated solution is agitated and disperse the anode active material 1. The conditions such as an agitating speed and agitating time may be voluntarily set. Finally, after the solution in which the anode active material 1 is dipped is filtered, the anode active material 1 is dried in the vacuum environment at high temperature to precipitate the alkali metal salt and the like dissolved in the solution on the surface of the anode active material 1. The conditions such as a degree of vacuum (pressure), temperature, and drying time may be voluntarily set. Thereby, the plurality of covering particles 2 are formed on the surface of the anode active material 1, and accordingly the anode material is fabricated.

When the anode material is formed, for example, by adjusting the dissolution amount (weight) of the alkali metal salt and the like in the treated solution and the input amount (weight) of the anode active material 1 into the treated solution, the ratio of the plurality of covering particles 2 to the anode active material 1 may be set to a desired value.

When the treated solution is filtered, there is a possibility that part of the alkali metal salt and the like remains on the wall face of the vessel containing the treated solution and an error is generated between the dissolution amount and the precipitation amount of the alkali metal salt and the like. However, if the treated solution in which the anode active material 1 is dipped is sufficiently agitated and then filtered, most of the alkali metal salt and the like dissolved in the treated solution is transferred to and fixed on the surface of the anode active material 1, and thus the foregoing error becomes extremely small. Accordingly, by the foregoing method, the ratio of the plurality of covering particles 2 to the anode active material 1 may be precisely set.

According to the anode material and the method of manufacturing it of this embodiment, the anode active material 1 is formed from the carbon material capable of intercalating and deintercalating the electrode reactant, and the plurality of covering particles 2 containing at least one of the alkali metal salt and the alkali earth metal salt are formed on the surface of the anode active material 1. Thus, compared to a case that the plurality of covering particles 2 are not formed, the following advantages are obtained. Firstly, since intercalation and deintercalation of the electrode reactant are easily generated in the anode active material 1, electrode reaction is easily generated even in the case that the current density of the anode is increased. Secondly, since the chemical stability of the anode active material 1 is improved, the anode active material 1 is hardly reacted with other material even in the case that the anode active material 1 becomes highly reactive in electrode reaction. Therefore, the anode material and the method of manufacturing it of this embodiment contributes to improvement of the performance of the electrochemical device using the anode material.

In this case, since the plurality of covering particles 2 are formed by simple treatment in which the alkali metal salt and the like are dissolved and then precipitated, the plurality of covering particles 2 may be simply and stably formed.

In particular, when the anode active material 1 contains natural graphite as a carbon material, or the ratio of the plurality of covering particles 2 to the anode active material 1 is in the range from 0.1 wt % to 10 wt %, higher effects are obtained.

Next, a description will be hereinafter given of a usage example of the foregoing anode material. As an example of the electrochemical devices including the anode, batteries are herein taken. The anode material is used for the batteries as follows.

First Battery

Figure 2:
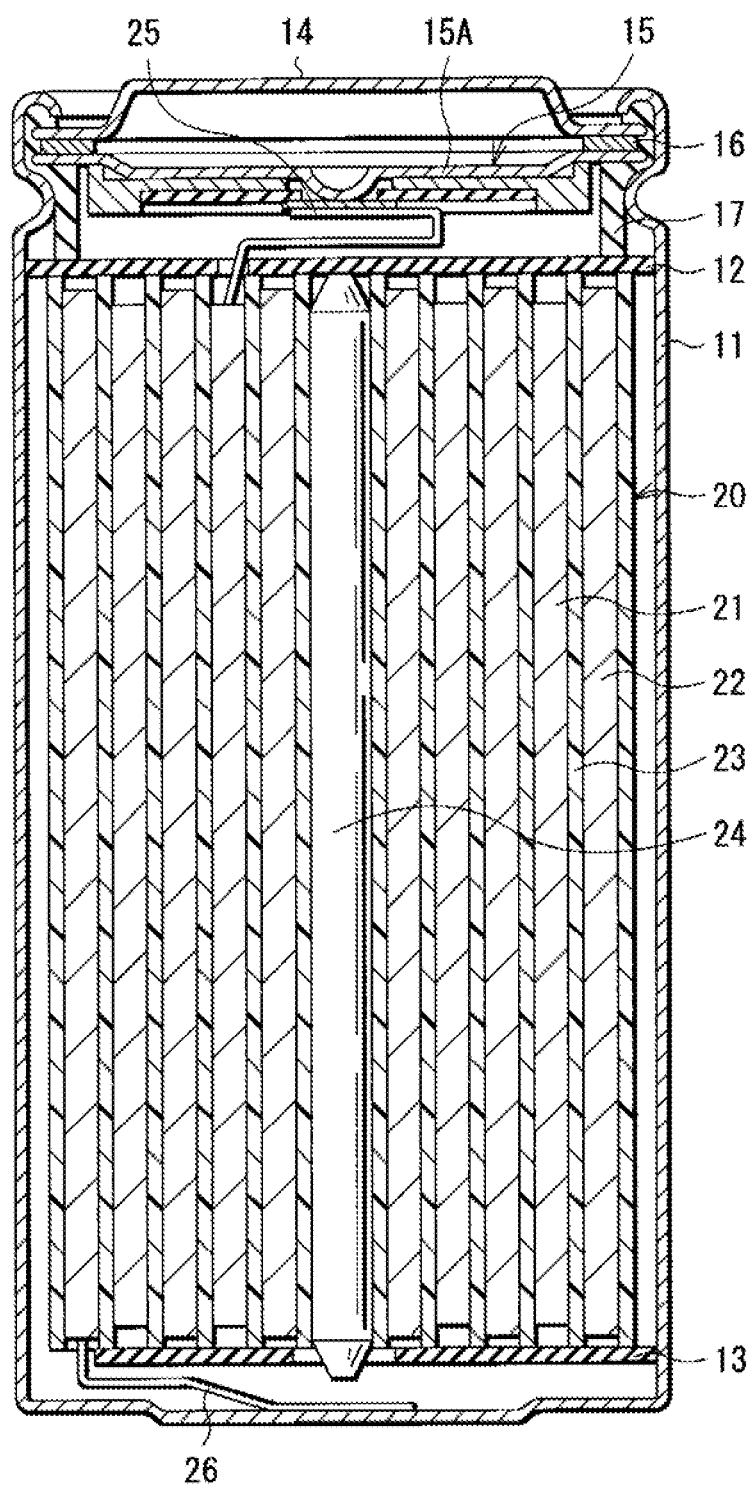
FIG. 2 is a cross section showing a structure of a first battery.

FIG. 2 shows a cross sectional structure of a first battery. The battery is a lithium ion secondary battery in which the anode capacity is expressed based on intercalation and deintercalation of lithium as an electrode reactant.

In the secondary battery, a spirally wound electrode body 20 in which a cathode 21 and an anode 22 are layered with a separator 23 in between and spirally wound and a pair of insulating plates 12 and 13 are contained in a battery can 11 in the shape of an approximately hollow cylinder. The battery can 11 is made of, for example, iron plated by nickel. One end of the battery can 11 is closed, and the other end thereof is opened. The pair of insulating plates 12 and 13 is respectively arranged perpendicular to the winding periphery face, so that the spirally wound electrode body 20 is sandwiched between the insulating plates 12 and 13. The battery structure using the cylindrical battery can 11 is called cylindrical type.

At the open end of the battery can 11, a battery cover 14, and a safety valve mechanism 15 and a Positive Temperature Coefficient (PTC) device 16 provided inside the battery cover 14 are attached by being caulked with a gasket 17. Inside of the battery can 11 is thereby hermetically closed. The battery cover 14 is, for example, made of a material similar to that of the battery can 11. The safety valve mechanism 15 is electrically connected to the battery cover 14 through the PTC device 16. If the internal pressure of the battery becomes a certain level or more due to internal short circuit, external heating or the like, a disk plate 15A flips to cut the electrical connection between the battery cover 14 and the spirally wound electrode body 20. When temperature rises, the PTC device 16 limits a current by increasing the resistance value to prevent abnormal heat generation by a large current. The gasket 17 is made of, for example, an insulating material and its surface is coated with asphalt.

A center pin 24 may be inserted in the center of the spirally wound electrode body 20. In the spirally wound electrode body 20, a cathode lead 25 made of aluminum or the like is connected to the cathode 21, and an anode lead 26 made of nickel or the like is connected to the anode 22. The cathode lead 25 is electrically connected to the battery cover 14 by being welded to the safety valve mechanism 15. The anode lead 26 is welded and electrically connected to the battery can 11.

Figure 3:
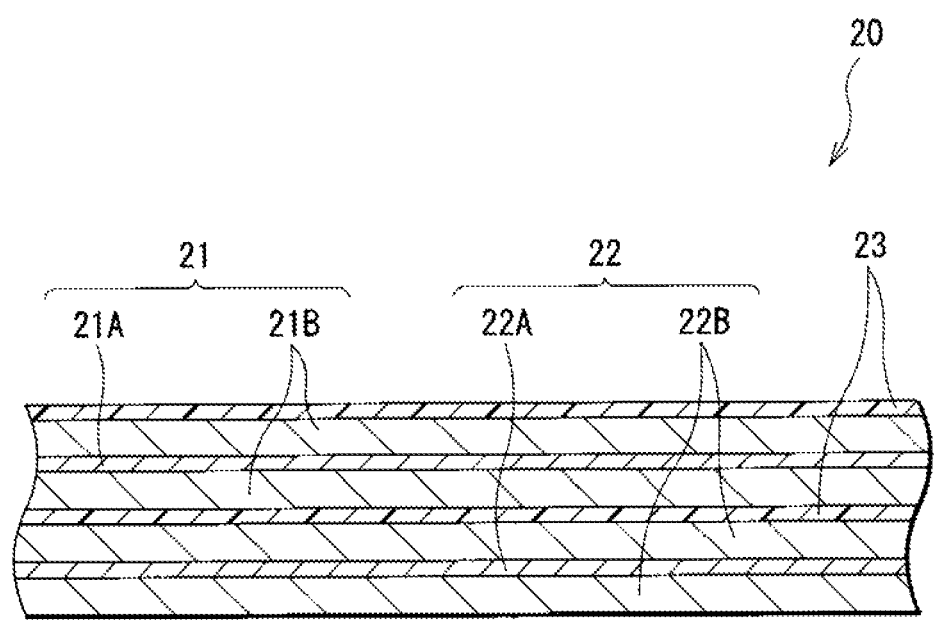
FIG. 3 is a cross section showing an enlarged part of the spirally wound electrode body shown in FIG. 2.

FIG. 3 shows an enlarged part of the spirally wound electrode body 20 shown in FIG. 2. The cathode 21 has a structure in which, for example, a cathode active material layer 21B is provided on the both faces of a cathode current collector 21A having a pair of opposed faces. The cathode active material layer 21B may be provided on only a single face of the cathode current collector 21A.

The cathode current collector 21A is made of, for example, a metal material such as aluminum, nickel, and stainless. The cathode active material layer 21B contains as a cathode active material, for example, one or more materials capable of intercalating and deintercalating lithium as an electrode reactant. The cathode active material layer 21B may contain an electrical conductor, a binder and the like according to needs.

As the material capable of intercalating and deintercalating lithium, a lithium-containing compound is preferable, since thereby a high energy density is obtained. As the lithium-containing compound, for example, a complex oxide containing lithium and a transition metal element or a phosphate compound containing lithium and a transition metal element is cited. In particular, a compound containing at least one selected from the group consisting of cobalt, nickel, manganese, and iron as a transition metal element is preferable, since thereby a higher voltage is obtained. The chemical formula thereof is expressed by, for example, $Li_xM1O_2$ or $Li_yM2PO_4$. In the formula, M1 and M2 represent one or more transition metal elements. Values of x and y vary according to charge and discharge states of the battery, and are generally in the range of $0.05 \leq x \leq 1.10$ and $0.05 \leq y \leq 1.10$.

As the lithium complex oxide containing lithium and a transition metal element, for example, a lithium-cobalt complex oxide ($Li_xCoO_2$), a lithium-nickel complex oxide ($Li_xNiO_2$), a lithium-nickel-cobalt complex oxide ($Li_xNi_{(1-z)}Co_zO_2$ (z<1)), a lithium-nickel-cobalt-manganese complex oxide ($Li_xNi_{1(1-v-w)}Co_vMn_wO_2$ (v+w<1)), lithium-manganese complex oxide having a spinel structure ($LiMn_2O_4$) and the like are cited. Specially, the complex oxide containing nickel is preferable, since thereby a high battery capacity and superior cycle characteristics are obtained. As the phosphate compound containing lithium and a transition metal element, for example, lithium-iron phosphate compound ($LiFePO_4$), a lithium-iron-manganese phosphate compound ($LiFe_{(1-u)}Mn_uPO_4$ (u<1)) and the like are cited.

In addition to the foregoing compounds, for example, an oxide such as titanium oxide, vanadium oxide, and manganese dioxide; a disulfide such as iron disulfide, titanium disulfide, and molybdenum disulfide; a chalcogenide such as niobium selenide; and a conductive polymer such as polyaniline and polythiophene are cited.

As the electrical conductor, for example, a carbon material such as graphite, carbon black, acetylene black, and Ketjen black are cited. Such a carbon material may be used singly, or a plurality thereof may be used by mixture. The electrical conductor may be a metal material, a conductive polymer or the like as long as the material has the conductivity.

As the binder, for example, a synthetic rubber such as styrene-butadiene rubber, fluorinated rubber, and ethylene propylene diene; or a polymer material such as polyvinylidene fluoride is cited. One thereof may be used singly, or a plurality thereof may be used by mixture. When the cathode 21 and the anode 22 are spirally wound, the styrene-butadiene rubber, the fluorinated rubber or the like having flexibility is preferable.

The anode 22 has a structure in which an anode active material layer 22B is provided on the both faces of an anode current collector 22A having a pair of opposed faces. The anode active material layer 22B may be provided only on a single face of the anode current collector 22A.

The anode current collector 22A is preferably made of a metal material having favorable electrochemical stability, electric conductivity, and mechanical strength. As the metal material, for example, copper, nickel, stainless and the like are cited. Specially, copper is preferable, since thereby high electric conductivity is obtained. The anode active material layer 22B contains the foregoing anode material as the material capable of intercalating and deintercalating lithium as an electrode reactant. The anode active material layer 22B may contain an electrical conductor, a binder and the like according to needs.

In the secondary battery, it is preferable that the charge capacity of the anode active material is larger than the charge capacity of the cathode active material by adjusting the amount of the cathode active material and the amount of the anode active material capable of intercalating and deintercalating lithium.

Figure 4:
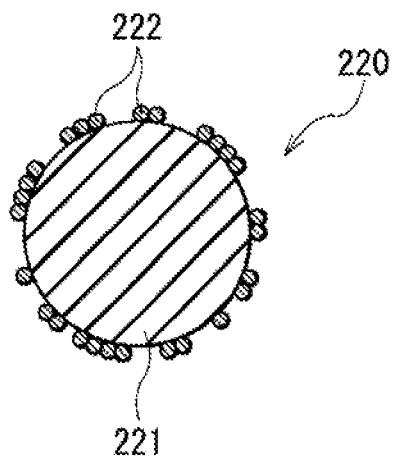
FIG. 4 is a cross section schematically showing a structure of an anode material used for the first battery before the initial charge.
Figure 5:
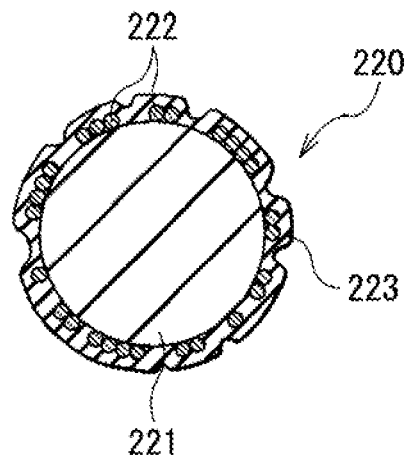
FIG. 5 is a cross section schematically showing a structure of the anode material used for the first battery after the initial charge.

FIG. 4 and FIG. 5 show cross sectional structures of an anode material 220 used for the anode active material layer 22B. Both FIG. 4 and FIG. 5 correspond to FIG. 1.

Before the initial charge, as shown in FIG. 4, the anode material 220 has a structure similar to that of the foregoing anode material 10, and has a plurality of covering particles 222 on the surface of an anode active material 221 capable of intercalating and deintercalating the electrode reactant. The structures of the anode active material 221 and the covering particles 222 are respectively similar to the structures of the anode active material 1 and the covering particles 2.

After the initial charge, as shown in FIG. 5, the anode material 220 may have a coat 223 covering the plurality of covering particles 222 together with the anode active material 221 and the plurality of covering particles 222. The coat 223 is formed by irreversible reaction between the anode material 220 and an electrolytic solution in the initial charge in the nonaqueous solvent-based system electrolytic solution. The coat 223 forms a stable interface that has electrode reactant ion (in this case, lithium ion) conductivity but does not have electron conductivity between the anode 22 and the electrolytic solution. That is, the coat 223 is a so-called Solid Electrolyte Interface (SEI) film, and contains a decomposition product and the like of the electrolytic solution. For example, in a lithium ion secondary battery in which the electrolytic solution contains an ester carbonate solvent, the coat 223 contains a material having lithium, carbon, oxygen and the like as an element. When the coat 223 exists, intercalation and de-intercalation of lithium ions are easily generated in the anode 22 in charge and discharge.

As shown in FIG. 5, the covering particles 222 are formed separately from the coat 223. That is, the coat 223 is formed through the initial charge, while the covering particles 222 have been previously formed on the surface of the anode active material 221 irrespective of presence of charge. The structure of the anode material 220 shown in FIG. 4 (structure that the plurality of covering particles 222 exist on the surface of the anode active material 221) and the structure of the anode material 220 shown in FIG. 5 (structure that the plurality of covering particles 222 and the coat 223 exist on the surface of the anode active material 221) may be identified by element analysis with the use of ESCA as in the foregoing anode material. In the latter case, the covering particles 222 and the coat 223 may be partly diffused in each other. In this case, the structure of the anode material 220 may be also identified by ESCA. This is because in the element analysis by ESCA, the alkali metal salt and the like are supposed to be measured as a rich region for the covering particles 222, and the foregoing lithium, carbon, oxygen and the like are supposed to be measured as a rich region for the coat 223.

The thickness of the anode active material layer 22B is not particularly limited, but the thickness of the anode active material layer 22B is preferably a thickness obtained by thickening of the anode active material layer (for example, 50 μm or more) to obtain a high battery capacity, since thereby a sufficient battery capacity is obtained. In particular, the foregoing thickness is preferably in the range from 60 μm to 120 μm. Thereby, the effect obtained by providing the plurality of covering particles 222 on the anode active material 221 becomes higher, specifically, the cycle characteristics are further improved. More specifically, if the thickness of the anode active material layer 22B is excessively thick, intercalation and de-intercalation of lithium ions may be hardly generated. The foregoing thickness of the "anode active material layer 22B" is a thickness of the anode active material layer 22B on a single face side of the anode current collector 22A. That is, in the case where the anode active material layer 22B is provided on the both faces of the anode current collector 22A, the thickness of the anode active material layer 22B does not indicate the sum of the respective thicknesses of the respective anode active material layers 22B on the both sides of the anode current collector 22A, but indicates each thickness of the anode active material layer 22B on a single side. The definition and the appropriate range of the thickness of the anode active material layer 22B are similarly applied to the thickness of the cathode active material layer 21B.

The volume density of the anode active material layer 22B is not particularly limited, but the volume density of the anode active material layer 22B is preferably a volume density obtained by increase of the volume density of the anode active material layer (for example, 1.60 g/cm$^3$ or more) to obtain a high battery capacity, since thereby a sufficient battery capacity is obtained. In particular, the volume density is preferably in the range from 1.70 g/cm$^3$ to 1.95 g/cm$^3$. Thereby, the cycle characteristics are further improved for the reason similar to that in the case of setting the thickness of the anode active material layer 22B to the appropriate value range.

The separator 23 separates the cathode 21 from the anode 22, prevents current short circuit due to contact of both electrodes, and passes lithium ions. The separator 23 is made of, for example, a porous film made of a synthetic resin such as polytetrafluoroethylene, polypropylene, and polyethylene, or a ceramic porous film. The separator 23 may have a structure in which two or more of the foregoing porous films are layered. Specially, the porous film made of polyolefin is preferable, since such a film has a superior short circuit preventive effect and improves battery safety by shutdown effect. In particular, polyethylene is preferable, since polyethylene provides shutdown effect at from 100 deg C. to 160 deg C. and has superior electrochemical stability. Further, polypropylene is also preferable. In addition, as long as chemical stability is secured, a resin formed by copolymerizing or blending with polyethylene or polypropylene may be used.

The electrolytic solution as a liquid electrolyte is impregnated in the separator 23. The electrolytic solution contains a solvent and an electrolyte salt dissolved in the solvent.

The solvent contains, for example, one or more nonaqueous solvents such as an organic solvent. The nonaqueous solvents include, for example, ethylene carbonate, propylene carbonate, butylene carbonate, dimethyl carbonate, diethyl carbonate, ethyl methyl carbonate, γ-butyrolactone, γ-valerolactone, 1,2-dimethoxyethane, tetrahydrofuran, 2-methyltetrahydrofuran, 1,3-dioxolane, 4-methyl-1,3-dioxolane, methyl acetate, methyl propionate, ethyl propionate, acetonitrile, glutaronitrile, adiponitrile, methoxyacetonitrile, 3-nmethoxypropionitrile, N,N-dimethylformamide, N-methylpyrrolidinone, N-methyloxazolidinone, nitromethane, nitroethane, sulfolane, dimethyl sulfoxide, trimethyl phosphate, ethylene sulfite, bistrifluoromethylsulfonylimidetrimethylhexyl ammonium and the like are cited. The solvent may be used singly, or a plurality thereof may be used by mixture. Specially, at least one of ethylene carbonate, propylene carbonate, dimethyl carbonate, diethyl carbonate, and ethyl methyl carbonate is preferable. Thereby, a superior battery capacity, superior cycle characteristics, and superior storage characteristics are obtained. In this case, a mixture of a high-viscosity (high dielectric constant) solvent (for example, specific inductive ∈≥30) such as ethylene carbonate and propylene carbonate and a low-viscosity solvent (for example, viscosity≤1 mPa·s) such as dimethyl carbonate, ethyl methyl carbonate, and diethyl carbonate is preferable. Thereby, the dissociation property of the electrolyte salt and the ion mobility are improved, and thus higher effects are obtained.

The solvent preferably contains a cyclic ester carbonate having an unsaturated bond, a chain ester carbonate having a halogen as an element, a cyclic ester carbonate having a halogen as an element or the like, since thereby the cycle characteristics are improved. As the cyclic ester carbonate having an unsaturated bond, for example, vinylene carbonate, vinylethylene carbonate and the like are cited. As the chain ester carbonate having a halogen, for example, fluoromethyl methyl carbonate, bis(fluoromethyl) carbonate, difluoromethyl methyl carbonate and the like are cited. As the cyclic ester carbonate having a halogen, for example, 4-fluoro-1,3-dioxolane-2-one, 4,5-difluoro-1,3-dioxolane-2-one and the like are cited. One thereof may be used singly, or a plurality thereof may be used by mixture.

The electrolyte salt contains, for example, one or more light metal salts such as a lithium salt. As the lithium salt, for example, lithium hexafluorophosphate (LiPF$_6$), lithium tetrafluoroborate (LiBF$_4$), lithium perchlorate (LiClO$_4$), lithium hexafluoroarsenate (LiAsF$_6$), lithium bis(pentafluoroethanesulfonyl)imide (LiN(C$_2$F$_5$SO$_2$)$_2$), lithium trifluoromethanesulfonate (LiCF$_3$SO$_3$), lithium bis(trifluoromethaanesulfonyl)imide (LiN(CF$_3$SO$_2$)$_2$), lithium tris(trifluoromethanesulfonyl)methide (LiC(CF$_3$SO$_2$)$_3$), lithium chloride (LiCl), lithium bromide (LiBr) and the like are cited. Thereby, superior battery capacity, superior cycle characteristics, and superior storage characteristics are obtained. One thereof may be used singly, or a plurality thereof may be used by mixture. Specially, lithium hexafluorophosphate is preferable, since the internal resistance is lowered, and thus higher effects are obtained.

The content of the electrolyte salt is preferably in the range from 0.3 mol/kg to 3.0 mol/kg to the solvent. If the content is out of the range, the ion conductivity is lowered and thus there is a possibility that a sufficient battery capacity may not be obtained.

In the secondary battery, when charged, for example, lithium ions are deintercalated from the cathode 21 and intercalated in the anode 22 through the electrolytic solution impregnated in the separator 23. Meanwhile, when discharged, for example, lithium ions are deintercalated from the anode 22 and intercalated in the cathode 21 through the electrolytic solution impregnated in the separator 23.

The secondary battery may be manufactured, for example, by the following procedure.

First, the cathode 21 is formed by forming the cathode active material layer 21B on the both faces of the cathode current collector 21A. In this case, for example, cathode active material powder, an electrical conductor, and a binder are mixed to prepare a cathode mixture, which is dispersed in a solvent to form paste cathode mixture slurry. Subsequently, the cathode current collector 21A is uniformly coated with the cathode mixture slurry. After the resultant is dried, the resultant is compression-molded.

Further, the anode 22 is formed by forming the anode active material layer 22B on the both faces of the cathode current collector 22A by using the foregoing anode material. In this case, for example, anode material powder, an electrical conductor, and a binder are mixed to prepare an anode mixture, which is dispersed in a solvent to form paste anode mixture slurry. Subsequently, the anode current collector 22A is uniformly coated with the anode mixture slurry. After the resultant is dried, the resultant is compression-molded.

When the cathode active material layer 21B and the anode active material layer 22B are formed, instead of coating the cathode current collector 21A and the anode current collector 22A with the cathode mixture slurry and the anode mixture slurry as described above, the cathode mixture and the anode mixture may be respectively bonded to the cathode current collector 21A and the anode current collector 22A.

Next, the cathode lead 25 is attached to the cathode current collector 21A by welding, and the anode lead 26 is attached to the anode current collector 22A by welding. After that, the cathode 21 and the anode 22 are spirally wound with the separator 23 in between to form the spirally wound electrode body 20. Subsequently, the end of the cathode lead 25 is welded to the safety valve mechanism 15, and the end of the anode lead 26 is welded to the battery can 11. After that, while the spirally wound electrode body 20 is sandwiched between the pair of insulating plates 12 and 13, the spirally wound electrode body 20 is contained in the battery can 11. Subsequently, the electrolytic solution is injected into the battery can 11, and impregnated in the separator 23. Finally, the battery cover 14, the safety valve mechanism 15, and the PTC device 16 are fixed at the open end of the battery can 11 by being caulked with the gasket 17. The secondary battery shown in FIG. 2 and FIG. 3 is thereby fabricated.

According to the cylindrical type secondary battery and the method of manufacturing it, the anode active material layer 22B of the anode 22 contains the anode material 220 having the structure similar to that of the anode material described above. Thus, even in the case that thickening of the anode active material layer 22B and increase of the volume density of the anode active material layer 22B are implemented to obtain a high battery capacity, lithium ions are smoothly intercalated and deintercalated in charge and discharge, and decomposition reaction of the electrolytic solution is inhibited. Therefore, while the input and output characteristics are secured, the cycle characteristics are improved.

In particular, in the case that the anode active material 221 of the anode material 220 contains a carbon material, the input and output characteristics tend to be lowered in the case of thickening of the anode active material layer 22B and increase of the volume density of the anode active material layer 22B are implemented. Thus, by providing the plurality of covering particles 222 on the anode active material 221, sufficient input and output characteristics are obtained even in the case thickening of the anode active material layer 22B and increase of the volume density of the anode active material layer 22B are implemented.

In particular, when the anode active material 221 contains natural graphite as a carbon material, the battery capacity and the cycle characteristics are further improved. Further, when the ratio of the plurality of covering particles 222 to the anode active material 221 is in the range from 0.1 wt % to 10 wt %, the cycle characteristics are further improved.

Further, if the thickness of the anode active material layer 22B is in the range from 60 μm to 120 μm, or if the volume density of the anode active material layer 22B is in the range from 1.70 g/cm$^3$ to 1.95 g/cm$^3$, the cycle characteristics are further improved.

Second Battery

Figure 6:
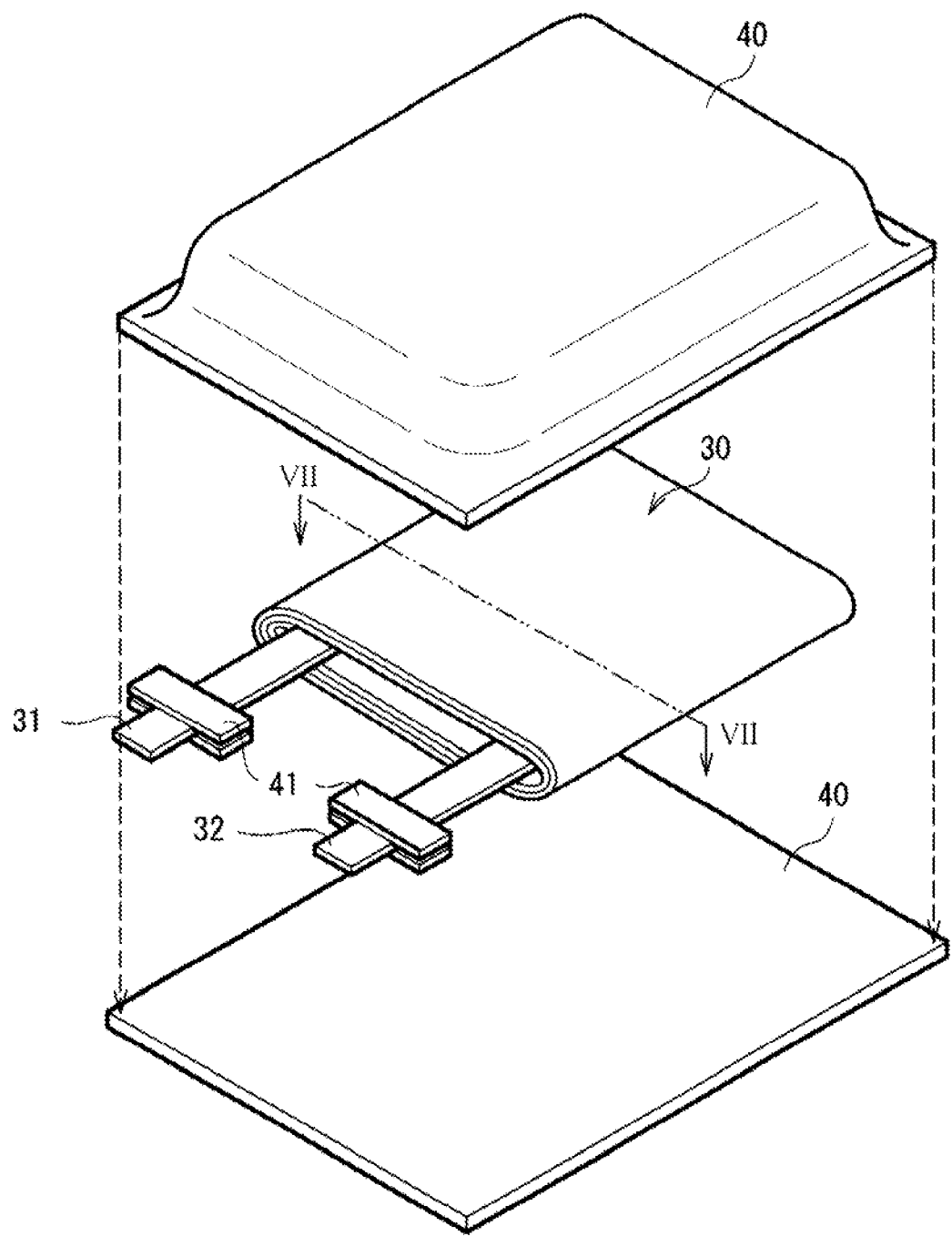
FIG. 6 is an exploded perspective view showing a structure of a second battery.

FIG. 6 shows an exploded perspective structure of a second battery. In the battery, a spirally wound electrode body 30 to which a cathode lead 31 and an anode lead 32 are attached is contained in a film package member 40. The battery structure using the film package member 40 is called laminated film type.

The cathode lead 31 and the anode lead 32 are respectively derived in the same direction from inside to outside of the package member 40. The cathode lead 31 is made of, for example, a metal material such as aluminum, and the anode lead 32 is made of, for example, a metal material such as copper, nickel, and stainless. The metal material composing the cathode lead 31 and the anode lead 32 is in the shape of a thin plate or mesh.

The package member 40 is made of a rectangular aluminum laminated film in which, for example, a nylon film, an aluminum foil, and a polyethylene film are bonded together in this order. In the package member 40, for example, the polyethylene film and the spirally wound electrode body 30 are opposed to each other, and the respective outer edges are contacted to each other by fusion bonding or an adhesive. Adhesive films 41 to protect from entering of outside air are inserted between the package member 40 and the cathode lead 31, the anode lead 32. The adhesive film 41 is made of a material having contact characteristics to the cathode lead 31 and the anode lead 32, for example, is made of a polyolefin resin such as polyethylene, polypropylene, modified polyethylene, and modified polypropylene.

The package member 40 may be made of a laminated film having other structure, a polymer film made of polypropylene or the like, or a metal film, instead of the foregoing the layer aluminum laminated film.

Figure 7:
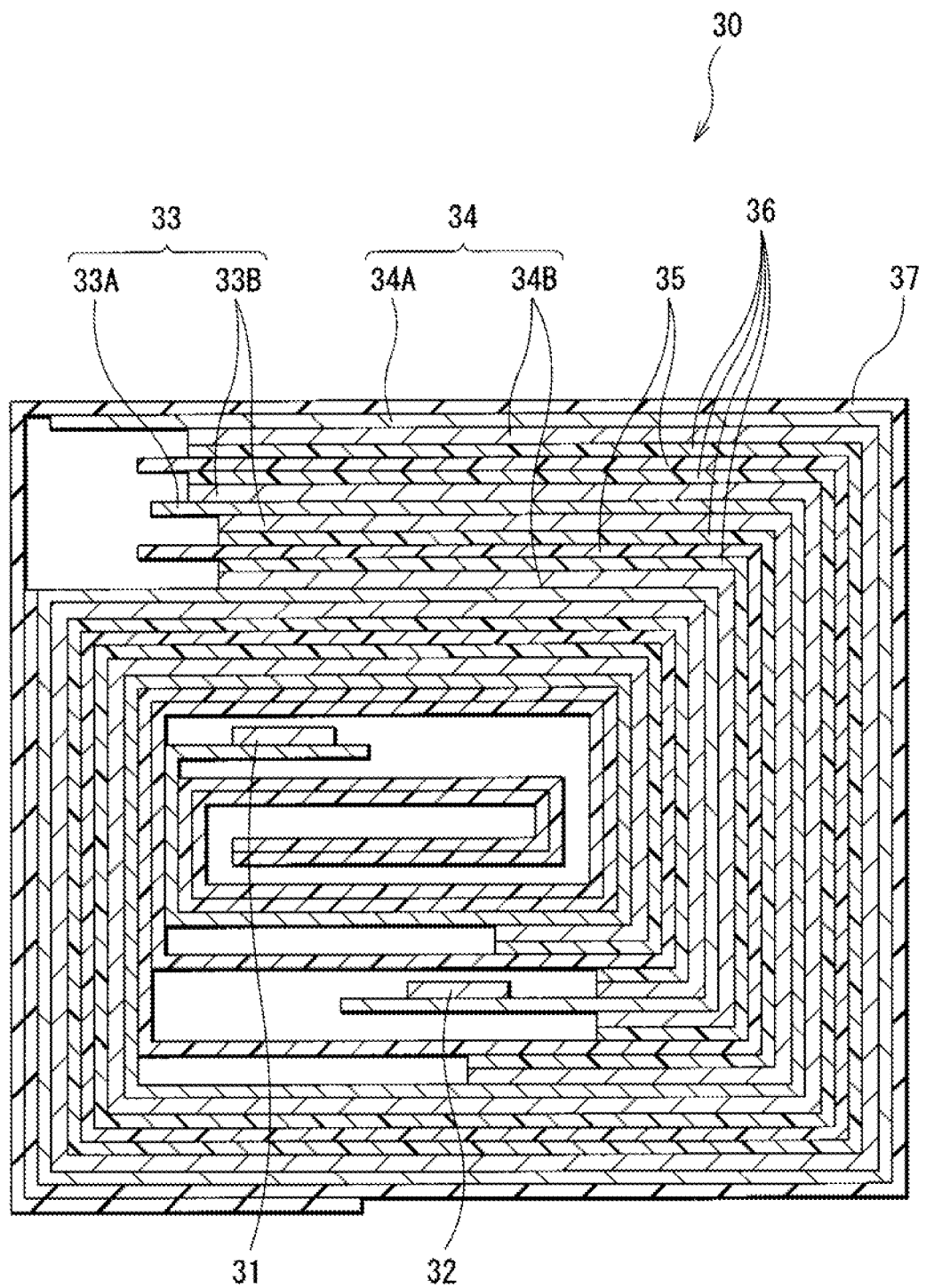
FIG. 7 is a cross section showing a structure taken along line VII-VII of the spirally wound electrode body shown in FIG. 6.

FIG. 7 shows a cross sectional structure taken along line VII-VII of the spirally wound electrode body 30 shown in FIG. 6. In the spirally wound electrode body 30, a cathode 33 and an anode 34 are layered with a separator 35 and an electrolyte 36 in between and then spirally wound. The outermost periphery thereof is protected by a protective tape 37.

The cathode 33 has a structure in which a cathode active material layer 33B is provided on the both faces of a cathode current collector 33A. The anode 34 has a structure in which an anode active material layer 34B is provided on the both faces of an anode current collector 34A. Structures of the cathode current collector 33A, the cathode active material layer 33B, the anode current collector 34A, the anode active material layer 34B, and the separator 35 are respectively similar to those of the cathode current collector 21A, the cathode active material layer 21B, the anode current collector 22A, the anode active material layer 22B, and the separator 23 in the first battery.

Figure 8:
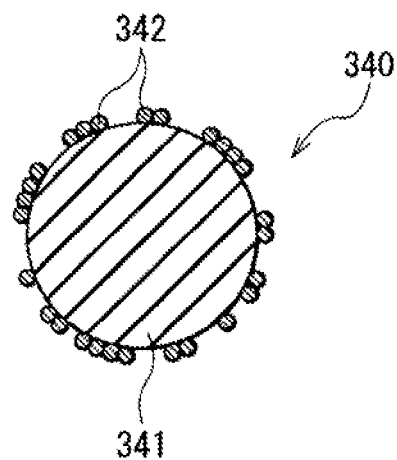
FIG. 8 is a cross section schematically showing a structure of an anode material used for the second battery before the initial charge.
Figure 9:
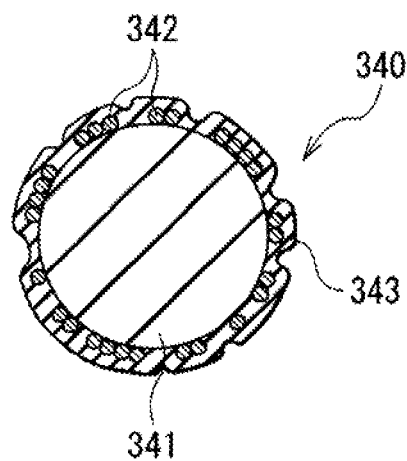
FIG. 9 is a cross section schematically showing a structure of the anode material used for the second battery after the initial charge.

FIG. 8 and FIG. 9 show cross sectional structures of an anode material 340 used for the anode active material layer 34B. FIG. 8 and FIG. 9 respectively correspond to FIG. 4 and FIG. 5. The anode material 340 has a structure similar to that of the anode material 220 in the first battery. Before the initial charge, as shown in FIG. 8, the anode material 340 has a plurality of covering particles 342 on the surface of an anode active material 341. After the initial charge, as shown in FIG. 9, the anode material 340 have a coat 343 together with the anode active material 341 and the plurality of covering particles 342. The structures of the anode active material 341, the covering particles 342, and the coat 343 are respectively similar to the structures of the anode active material 221, the covering particles 222, and the coat 223 in the first battery.

The electrolyte 36 is so-called gelatinous, containing an electrolytic solution and a polymer compound that holds the electrolytic solution. The gel electrolyte is preferable, since a high ion conductivity (for example, 1 mS/cm or more at room temperature) is thereby obtained, and leakage of the battery is thereby prevented.

As the polymer compound, for example, an ether polymer compound such as polyethylene oxide and a cross-linked body containing polyethylene oxide, an ester polymer compound such as polymethacrylate or an acrylate polymer compound, or a polymer of vinylidene fluoride such as polyvinylidene fluoride and a copolymer of vinylidene fluoride and hexafluoropropylene are cited. One thereof is used singly, or a plurality thereof are used by mixing. In particular, in terms of redox stability, the fluorinated polymer compound such as the polymer of vinylidene fluoride is preferable. The additive amount of the polymer compound in the electrolytic solution varies according to compatibility therebetween, but is preferably in the range from 5 wt % to 50 wt %.

The composition of the electrolytic solution is similar to the composition of the electrolytic solution in the foregoing first battery. However, the solvent in the second battery mean-s a wide concept including not only the liquid solvent but also a solvent having ion conductivity capable of dissociating the electrolyte salt. Therefore, when the polymer compound having ion conductivity is used, the polymer compound is also included in the solvent.

Instead of the electrolyte 36 in which the electrolytic solution is held by the polymer compound, the electrolytic solution may be directly used. In this case, the electrolytic solution is impregnated in the separator 35.

In the secondary battery, when charged, for example, lithium ions are deintercalated from the cathode 33 and intercalated in the anode 34 through the electrolyte 36. Meanwhile, when discharged, lithium ions are deintercalated from the anode 34 and intercalated in the cathode 33 through the electrolyte 36.

The secondary battery may be manufactured, for example, by the following three manufacturing methods.

In the first manufacturing method, first, the cathode 33 is formed by forming the cathode active material layer 33B on the both faces of the cathode current collector 33A, and the anode 34 is formed by forming the anode active material layer 34B on the both faces of the anode current collector 34A by a procedure similar to that of the method of manufacturing the first battery. Subsequently, a precursor solution containing an electrolytic solution, a polymer compound, and a solvent is prepared. After the cathode 33 and the anode 34 are coated with the precursor solution, the solvent is volatilized to form the gel electrolyte 36. Subsequently, the cathode lead 31 and the anode lead 32 are respectively attached to the cathode current collector 33A and the anode current collector 34A. Subsequently, the cathode 33 and the anode 34 formed with the electrolyte 36 are layered with the separator 35 in between to obtain a laminated body. After that, the laminated body is spirally wound in the longitudinal direction, the protective tape 37 is adhered to the outermost periphery thereof to form the spirally wound electrode body 30. Finally, for example, after the spirally wound electrode body 30 is sandwiched between two pieces of the film package members 40, outer edges of the package members 40 are contacted by thermal fusion bonding or the like to enclose the spirally wound electrode body 30. Then, the adhesive films 41 are inserted between the cathode lead 31, the anode lead 32 and the package member 40. Thereby, the secondary battery is fabricated.

In the second manufacturing method, first, the cathode lead 31 and the anode lead 32 are respectively attached to the cathode 33 and the anode 34. After that, the cathode 33 and the anode 34 are layered with the separator 35 in between and spirally wound. The protective tape 37 is adhered to the outermost periphery thereof, and thereby a spirally wound body as a precursor of the spirally wound electrode body 30 is formed. Subsequently, after the spirally wound body is sandwiched between two pieces of the film package members 40, the outermost peripheries except for one side are thermally fusion-bonded to obtain a pouched state, and the spirally wound body is contained in the pouch-like package member 40. Subsequently, a composition of matter for electrolyte containing an electrolytic solution, a monomer as a raw material for the polymer compound, a polymerization initiator, and if necessary other material such as a polymerization inhibitor is prepared, which is injected into the pouch-like package member 40. After that, the opening of the package member 40 is hermetically sealed by thermal fusion bonding or the like. Finally, the monomer is thermally polymerized to obtain a polymer compound. Thereby, the gel electrolyte 36 is formed. Accordingly, the secondary battery is fabricated.

In the third manufacturing method, first, the spirally wound body is formed and contained in the pouch-like package member 40 in the same manner as that of the foregoing first manufacturing method, except that the separator 35 with the both faces coated with a polymer compound is used. As the polymer compound with which the separator 35 is coated, for example, a polymer containing vinylidene fluoride as a component, that is, a homopolymer, a copolymer, a multicomponent copolymer and the like are cited. Specifically, polyvinylidene fluoride, a binary copolymer containing vinylidene fluoride and hexafluoropropylene as a component, a ternary copolymer containing vinylidene fluoride, hexafluoropropylene, and chlorotrifluoroethylene as a component and the like are cited. As a polymer compound, in addition to the foregoing polymer containing vinylidene fluoride as a component, another one or more polymer compounds may be used. Subsequently, an electrolytic solution is prepared and injected into the package member 40. After that, the opening of the package member 40 is sealed by thermal fusion bonding or the like. Finally, the resultant is heated while a weight is applied to the package member 40, and the separator 35 is contacted to the cathode 33 and the anode 34 with the polymer compound in between. Thereby, the electrolytic solution is impregnated into the polymer compound, and the polymer compound is gelated to form the electrolyte 36. Accordingly, the secondary battery is fabricated.

In the third manufacturing method, the swollenness characteristics are improved compared to the first manufacturing method. Further, in the third manufacturing method, the monomer as a raw material of the polymer compound, the solvent and the like hardly remain in the electrolyte 36 compared to in the second manufacturing method, and the steps of forming the polymer compound are favorably controlled. Thus, sufficient contact characteristics are obtained between the cathode 33/the anode 34/the separator 35 and the electrolyte 36.

The action and the effect of the laminated film type secondary battery and the method of manufacturing it are similar to those of the foregoing first battery.

Second Embodiment

A description will be hereinafter given of a second embodiment.

The anode material of this embodiment has a structure similar to that of the anode material of the first embodiment (refer to FIG. 1), except that the component material of the anode active material 1 is different.

The anode active material 1 contains, for example, a material containing at least one of a metal element and a metalloid element as one or more materials capable of intercalating and deintercalating the electrode reactant, since a high energy density is thereby obtained. Such a material containing at least one of a metal element and a metalloid element may be a simple substance, an alloy, or a compound of a metal element or a metalloid element, or may have one or more phases thereof at least in part.

The alloy in the present application includes an alloy containing one or more metal elements and one or more metalloid elements, in addition to an alloy composed of two or more metal elements. Further, the alloy may contain a nonmetallic element. The texture thereof includes a solid solution, a eutectic crystal (eutectic mixture), an intermetallic compound, and a texture in which two or more thereof coexist.

As the foregoing metal element or the foregoing metalloid element, for example, a metal element or a metalloid element capable of forming an alloy with the electrode reactant is cited. Specifically, magnesium, boron, aluminum, gallium, indium, silicon, germanium, tin, lead (Pb), bismuth, cadmium (Cd), silver, zinc, hafnium, zirconium, yttrium (Y), palladium (Pd), platinum (Pt) and the like are cited. Specially, at least one selected from the group consisting of silicon and tin is preferable. Silicon and tin have the high ability to intercalate and deintercalate the electrode reactant, and thus provide an extremely high energy density.

As a material containing at least one of silicon and tin, for example, the simple substance, an alloy, or a compound of silicon; the simple substance, an alloy, or a compound of tin; or a material having one or more phases thereof at least in part is cited. Each thereof may be used singly, or a plurality thereof may be used by mixture.

As the alloy of silicon, for example, a material containing at least one selected from the group consisting of tin, nickel, copper, iron, cobalt, manganese, zinc, indium, silver, titanium, germanium, bismuth, antimony, and chromium as the second element other than silicon is cited. As the compound of silicon, for example, a material containing oxygen or carbon is cited, and may contain the foregoing second element in addition to silicon. Examples of ant alloy or a compound of silicon include, for example, $SiB_4$, $SiB_6$, $Mg_2Si$, $Ni_2Si$, $TiSi_2$, $MoSi_2$, $CoSi_2$, $NiSi_2$, $CaSi_2$, $CrSi_2$, $Cu_5Si$, $FeSi_2$, $MnSi_2$, $NbSi_2$, $TaSi_2$, $VSi_2$, $WSi_2$, $ZnSi_2$, $SiC$, $Si_3N_4$, $Si_2N_2O$, $SiO_v$ ($0 \leq v \leq 2$), $SnO_w$ ($0 \leq w \leq 2$), $LiSiO$ or the like is cited.

As the alloy of tin, for example, a material containing at least one selected from the group consisting of silicon, nickel, copper, iron, cobalt, manganese, zinc, indium, silver, titanium, germanium, bismuth, antimony, and chromium as the second element other than tin is cited. As the compound of tin, for example, a compound containing oxygen or carbon is cited. The compound may contain the foregoing second element in addition to tin. Examples of the alloy or the compound of tin include $SnSiO_3$, $LiSnO$, $Mg_2Sn$ or the like.

In particular, as the material containing at least one of silicon and tin, for example, a material containing the second element and the third element in addition to tin as the first element is preferable. As the second element, for example, at least one selected from the group consisting of cobalt, iron, magnesium, titanium, vaniadium, chromium, manganese, nickel, copper, zinc, gallium, zirconium, niobium, molybdenum, silver, indium, cerium, hafnium, tantalum, tungsten, bismuth, and silicon is cited. As the third element, for example, at least one selected from the group consisting of boron, carbon, aluminum, and phosphorus is cited. When the second element and the third element are contained in addition to tin, the cycle characteristics are improved.

Specially, a SnCoC-containing material that contains tin, cobalt, and carbon as an element in which the carbon content is in the range from 9.9 wt % to 29.7 wt %, and the cobalt ratio to the total of tin and cobalt (Co/(Sn+Co)) is in the range from 30 wt % to 70 wt % is preferable. In such a composition range, a high energy density is obtained.

The SnCoC-containing material may further contain other element according to needs. As other element, for example, silicon, iron, nickel, chromium, indium, niobium, germanium, titanium, molybdenum, aluminum, phosphorus, gallium, bismuth or the like is preferable. Two or more thereof may be contained, since thereby higher effects are obtained.

The SnCoC-containing material has a phase containing tin, cobalt, and carbon. Such a phase preferably has a low crystallinity structure or an amorphous structure. Further, in the SiCoC-containing material, at least part of carbon as an element is preferably bonded to a metal element or a metalloid element as other element. Cohesion or crystallization of tin or the like may be thereby inhibited.

The SnCoC-containing material may be formed by, for example, mixing raw materials of each element, dissolving the resultant mixture in an electric furnace, a high frequency induction furnace, an arc melting furnace or the like and then solidifying the resultant. Otherwise, the SnCoC-containing material may be formed by various atomization methods such as gas atomizing and water atomizing; various roll methods; or a method using mechanochemical reaction such as mechanical alloying method and mechanical milling method. Specially, the SnCoC-containing material is preferably formed by the method using mechanochemical reaction, since thereby the anode active material 1 may have a low crystalline structure or an amorphous structure. For the method using the mechanochemical reaction, for example, a manufacturing apparatus such as a planetary ball mill apparatus and an attliter may be used.

As a measurement method for examining bonding state of elements, for example, X-ray Photoelectron Spectroscopy (XPS) is cited. In XPS, in the case of graphite, the peak of 1 s orbit of carbon (C1s) is observed at a 284.5 eV in the apparatus in which energy calibration is made so that the peak of 4f orbit of gold atom (Au4f) is obtained in 84.0 eV. In the case of surface contamination carbon, the peak is observed at 284.8 eV. Meanwhile, in the case of higher electric charge density of carbon element, for example, when carbon is bonded to a metal element or a metalloid element, the peak of C1s is observed in the region lower than 284.5 eV. That is, when the peak of the composite wave of C1s obtained for the SnCoC-containing material is observed in the region lower than 284.5 eV, at least part of carbon contained in the SnCoC-containing material is bonded to the metal element or the metalloid element as other element.

In XPS, for example, the peak of C1s is used for correcting the energy axis of spectrums. Since surface contamination carbon generally exists on the surface, the peak of C1s of the surface contamination carbon is set to in 284.8 eV, which is used as all energy reference. In XPS, the waveform of the peak of C1s is obtained as a form including the peak of the surface contamination carbon and the peak of carbon in the SnCoC-containing material. Therefore, for example, by performing analysis by using commercially available software, the peak of the surface contamination carbon and the peak of carbon in the SnCoC-containing material are separated. In the analysis of the waveform, the position of the main peak existing on the lowest bound energy side is set to the energy reference (284.8 eV).

The anode material may be manufactured by a procedure similar to that of the first embodiment. At this time, the anode active material 1 may be formed by, for example, coating method, vapor-phase deposition method, liquid-phase deposition method, spraying method, firing method, or a combination of two or more of these methods. As vapor-phase deposition method, for example, physical deposition method or chemical deposition method is cited. Specifically, vacuum evaporation method, sputtering method, ion plating method, laser ablation method, thermal Chemical Vapor Deposition (CVD) method, plasma CVD method and the like are cited. As liquid-phase deposition method, a known technique such as electrolytic plating and electroless plating may be used. Firing method is, for example, a method in which a particulate anode active material mixed with a binder or the like is dispersed in a solvent and the anode current collector is coated with the resultant, and then heat treatment is provided at a temperature higher than the melting point of the binder or the like. For firing method, a known technique such as atmosphere firing method, reactive firing method, and hot press firing method is available as well.

According to the anode material and the method of manufacturing it of this embodiment, the anode active material 1 is formed from the material containing at least one of the metal element and the metalloid element as a material capable of intercalating and deintercalating the electrode reactant, and the plurality of covering particles 2 containing at least one of the alkali metal salt and the alkali earth metal salt are formed on the surface of the anode active material 1. Thus, by an action similar to that of the first embodiment, the anode material and the method of manufacturing it of this embodiment contribute to improve the performance of the electrochemical device using the anode material.

In particular, when the anode active material 1 contains at least one selected from the group consisting of the simple substance, an alloy, and a compound of silicon; and the simple substance, an alloy and a compound of tin, or when the anode active material 1 contains the material containing tin as the first element, cobalt or the like as the second element, and boron or the like as the third element, higher effects are obtained.

Other effects of the anode material and the method of manufacturing it of this embodiment are similar to those of the first embodiment.

The anode material and the method of manufacturing it of this embodiment may be used for the first and the second batteries as the first embodiment.

In the first battery, in the case where the simple substance, an alloy, or a compound of silicon; the simple substance, an alloy, or a compound of tin; or a material having one or more phases thereof at least in part is used as a component material of the anode active material 221, for example, it is preferable that the anode active material 221 is formed by vapor-phase deposition method, liquid-phase deposition method, spraying method, firing method, or a combination of two or more of these methods, and the anode active material layer 22B and the anode current collector 22A are alloyed in at least part of the interface thereof. Specifically, it is preferable that at the interface thereof, the element of the anode current collector 22A is diffused in the anode active material layer 22B; or the element of the anode active material layer 22B is diffused in the anode current collector 22A; or the both elements are diffused in each other. Thereby, destruction due to expansion and shrinkage of the anode active material layer 22B associated with charge and discharge is inhibited, and the electron conductivity between the anode active material layer 22B and the anode current collector 22A is improved. The same is applied to the second battery.

In a secondary battery and a method of manufacturing it using the anode material and the method of manufacturing it, effects similar to those of the first and the second batteries described above are also obtained. In particular, since the anode active materials 221 and 341 contain the material containing at least one of the metal element and the metalloid element, a high battery capacity is obtained.

EXAMPLES

Specific examples of the present application will be described in detail.

Example 1-1

The cylindrical type secondary battery shown in FIG. 2 to FIG. 4 was manufactured by the following procedure. The secondary battery was manufactured as a lithium ion secondary battery in which the capacity of the anode 22 was expressed based on intercalation and deintercalation of lithium.

First, the cathode 21 was formed. First, lithium carbonate ($Li_2CO_3$) and cobalt carbonate ($CoCO_3$) were mixed at a molar ratio of 0.5:1. After that, the mixture was fired in the air at 900 deg C. for 5 hours. Thereby, lithium cobalt complex oxide ($LiCoO_2$) was obtained. When the lithium cobalt complex oxide was analyzed by X-ray diffraction method, the obtained peak well corresponded with the peak registered in Joint Committee of Powder Diffraction Standard (JCPDS) file. Subsequently, the lithium cobalt complex oxide was pulverized into powder. After that, 95 parts by weight of the lithium cobalt complex oxide powder and 5 parts by weight of lithium carbonate powder were mixed to obtain a cathode active material. The cumulative 50% particle diameter of the lithium cobalt complex oxide measured by laser diffraction was 15 μm. Subsequently, 94 parts by weight of the cathode active material, 3 parts by weight of Ketjen black as an electrical conductor (Lion Corporation make), and 3 parts by weight of polyvinylidene fluoride as a binder were mixed to obtain a cathode mixture. After that, the cathode mixture was dispersed in N-methyl-2-pyrrolidone as a solvent to obtain paste cathode mixture slurry. Finally, the both faces of the cathode current collector 21A made of a strip-shaped aluminum foil (thickness: 20 μm) were uniformly coated with the cathode mixture slurry, which was dried. After that, the resultant was compression-molded by a roll pressing machine to form the cathode active material layer 21B. The thickness of the cathode active material layer 21B on a single face side of the cathode current collector 21A was 97 μm, and the volume density was 3.55 $g/cm^3$.

Next, the anode 22 was formed. First, as the anode active material 221, particulate graphite powder (Mesocarbon Microbead (MCMB)) as a carbon material was prepared. The lattice spacing $d_{002}$ in the C-axis direction measured by X-ray diffraction method was 0.3363 nm, the average particle diameter was 25 μm, and the specific surface area measured by nitrogen ($N_2$) Brunauer-Emmett-Teller (BET) method was 0.8 $m^2/g$. Subsequently, lithium chloride (LiCl) powder as an alkali metal salt was dissolved in water to prepare a lithium chloride water solution. After MCMB was dipped in the lithium chloride water solution, the resultant was agitated for 1 hour. Subsequently, the lithium chloride water solution in which MCMB was dipped was filtered. After that, the resultant was vacuum-dried for 1 hour at 120 deg C., lithium chloride was precipitated on the surface of the anode active material 221 to form the plurality of covering particles 222. Thereby, the anode material 220 was obtained.

When the specific surface area of the obtained anode material 220 was measured by nitrogen gas BET method, the specific surface area of the anode active material 221 was decreased by about 5%. Further, visual inspection was performed for the color appearance of the anode material before and after the covering particles 222 were foiled, the color was changed from black to gray over the entire area. Based on the decreased specific surface area and the change of color appearance, it was confirmed that the covering particles 222 were formed on the surface of the anode active material 221. For reference, the surface of the anode material 220 was observed by a Scanning Electron Microscope (SEM) at tell thousand times magnification. In the result, the covering particles 222 were not observed on the surface of the anode active material 221 at such a magnification. Accordingly, it was found that the particle diameter of each covering particle 222 was submicron scale or less.

When the covering particles 222 were formed, the water weight was maintained constant, the amount of lithium chloride dissolved therein was adjusted, and thereby the ratio of the plurality of covering particles 222 to the anode active material 221 was 1 wt %. For confirmation, the weight difference between before and after forming the covering particles 222 was examined. In the result, the weight difference corresponded with the dissolution amount of lithium chloride. Accordingly, it was confirmed that all lithium chloride in the lithium chloride water solution was precipitated on the surface of the anode active material 221.

Subsequently, 90 parts by weight of the anode material 220 and 10 parts by weight of polyvinylidene fluoride as a binder were mixed to obtain an anode mixture. After that, the anode mixture was dispersed in N-methyl-2-pyrrolidone as a solvent to obtain paste anode mixture slurry. Finally, the both faces of the anode current collector 22A made of a strip-shaped electrolytic copper foil (thickness: 15 μm) were uniformly coated with the anode mixture slurry, which was dried. After that, the resultant was compression-molded by a roll pressing machine to form the anode active material layer 22B. The thickness of the anode active material layer 22B on a single face side of the anode current collector 22A was 90 μm, and the volume density was 1.81 g/cm$^3$.

Subsequently, the secondary battery was assembled by using the cathode 21 and the anode 22. First, the cathode lead 25 made of aluminum was attached to one end of the cathode current collector 21A by welding, and the anode lead 26 made of nickel was attached to one end of the anode current collector 22A by welding. Subsequently, the cathode 21, the separator 23 (thickness: 25 μm) made of a microporous polyethylene stretched film, the anode 22, and the foregoing separator 23 were layered in this order. The resultant laminated body was spirally wound to form the spirally wound electrode body 20. Subsequently, the cathode lead 25 was welded to the safety valve mechanism 15, and the anode lead 26 was welded to the battery can 11. After that, while the spirally wound electrode body 20 was sandwiched between the pair of insulating plates 12 and 13, the spirally wound electrode body 20 was contained in the battery can 11 made of nickel-plated iron. Subsequently, an electrolytic solution was prepared. After that, the electrolytic solution was injected into the battery can 11 by depressurization method, and impregnated in the separator 23. When the electrolytic solution was prepared, ethylene carbonate, diethyl carbonate, propylene carbonate, and vinylethylene carbonate as a solvent were mixed at a weight ratio of 50:30:17:3 to obtain a mixture.

After that, lithium hexafluorophosphate (LiPF$_6$) as an electrolyte salt was dissolved in the mixture so that the concentration in the electrolytic solution was 1 mol/kg. Finally, the safety valve mechanism 15, the PTC device 16, and the battery cover 14 were fixed by caulking the battery can 11 with the gasket 17 coated with asphalt. Thereby, the air tightness of inside of the battery can 11 was secured, and the cylindrical type secondary battery being 18 mm in diameter and 65 mm high was fabricated.

Examples 1-2 to 1-6

A procedure was performed in the same manner as that of Example 11, except that sodium chloride (NaCl: Example 1-2), potassium chloride (KCl: Example 1-3), lithium carbonate (Li$_2$CO$_3$: Example 1-4), sodium carbonate (Na$_2$CO$_3$: Example 1-5), or potassium carbonate (K$_2$CO$_3$: Example 1-6) was used as an alkali metal salt.

Examples 1-7 and 1-8

A procedure was performed in the same manner as that of Example 1-1, except that magnesium carbonate (MgCO$_3$: Example 1-7) or calcium carbonate (CaCO$_3$: Example 1-8) was used as an alkali earth metal salt instead of the alkali metal salt.

Comparative Example 1

A procedure was performed in the same manner as that of Examples 1-1 to 1-8, except that the plurality of covering particles 222 were not formed.

When the input and output characteristics and the cycle characteristics of the secondary batteries of Examples 1-1 to 1-8 and Comparative example 1 were examined, the results shown in Table 1 were obtained.

In examining the input and output characteristics, after the secondary battery was charged and discharged in the atmosphere at 23 deg C., the initial charge and discharge efficiency (%)=(discharge capacity/charge capacity)×100 was calculated. At that time, charge was performed at the constant current of 1 C until the battery voltage reached 4.2 V, charge was continuously performed at the constant voltage of 4.2 V until the total charge time reached 4 hours. After that, discharge was performed at the constant current of 1500 mA until the battery voltage reached 3.0 V. The foregoing "1 C" means a current value with which the theoretical capacity is completely discharged in 1 hour.

In examining the cycle characteristics, charge and discharge were performed 1 cycle in the atmosphere at 23 deg C. to measure the discharge capacity, and then charge and discharge were continuously performed in the same atmosphere until the total number of cycles was 100 cycles to measure the discharge capacity. After that, the discharge capacity retention ratio (%)=(discharge capacity at the 100th cycle/discharge capacity at the first cycle)×100 was calculated. The charge and discharge conditions were similar to those in the case of examining the input and output characteristics.

The procedure and the conditions for examining the foregoing input and output characteristics and the foregoing cycle characteristics were similarly applied to the following examples and comparative examples.

TABLE 1

| Cylindrical type | Anode active material layer | | | | | Initial charge and discharge efficiency (%) | Discharge capacity retention ratio (%) |
| --- | --- | --- | --- | --- | --- | --- | --- |
| | Anode material | | | | | | |
| | Anode active material | Covering particles | | | | | |
| | | Type | Ratio (wt %) | Thickness (μm) | Volume density (g/cm³) | | |
| Example 1-1 | MCMB | LiCl | 1 | 90 | 1.81 | 91.5 | 83 |
| Example 1-2 | | NaCl | | | | 91.1 | 85 |
| Example 1-3 | | KCl | | | | 91 | 85 |
| Example 1-4 | | Li₂CO₃ | | | | 91.6 | 92 |
| Example 1-5 | | Na₂CO₃ | | | | 91 | 88 |
| Example 1-6 | | K₂CO₃ | | | | 91.6 | 92 |
| Example 1-7 | | MgCO₃ | | | | 91.1 | 79 |
| Example 1-8 | | CaCO₃ | | | | 91.2 | 80 |
| Comparative example 1 | MCMB | — | — | 90 | 1.81 | 90.2 | 64 |

As shown in Table 1, in Examples 1-1 to 1-8 in which the plurality of covering particles 222 were formed, the initial charge and discharge efficiency and the discharge capacity retention ratio were higher compared to those of Comparative example 1 in which the plurality of covering particles 222 were not formed irrespective of the type of alkali metal salt and alkali earth metal salt. Table 1 discloses no example in which an alkali metal salt and an alkali earth metal salt are mixed. However, it is evident from the results of Table 1 that the foregoing result was obtained when the alkali metal salt or the alkali earth metal salt was independently used. In addition, there is no particular reason for a lowered initial charge and discharge efficiency and a lowered discharge capacity retention ratio in the case of mixing the alkali metal salt and the alkali earth metal salt. Thus, it is evident that similar effects are also obtained when both the alkali metal salt and the alkali earth metal salt are mixed.

Accordingly, in the secondary battery of an embodiment, it was confirmed that the input and output characteristics were secured and the cycle characteristics were improved when the plurality of covering particles containing at least one of the alkali metal salt and the alkali earth metal salt were formed on the surface of the anode active material in the case that MCMB was used as an anode active material.

Examples 2-1 to 2-5

A procedure was performed in the same manner as that of Example 1-6, except that the thickness of the anode active material layer 22B was 95 μm, and the ratio of the plurality of covering particles 222 to the anode active material 221 was 0.05 wt % (Example 2-1), 0.1 wt % (Example 2-2), 1 wt % (Example 2-3), 10 wt % (Example 2-4), or 15 wt % (Example 2-5). In this case, the dissolution amount of potassium carbonate and the mixture ratio between the potassium carbonate water solution and the anode active material 221 were adjusted so that the ratio was the foregoing each value.

Comparative Example 2

A procedure was performed in the same manner as that of Examples 2-1 to 2-5, except that the plurality of covering particles 222 were not formed.

Figure 10:
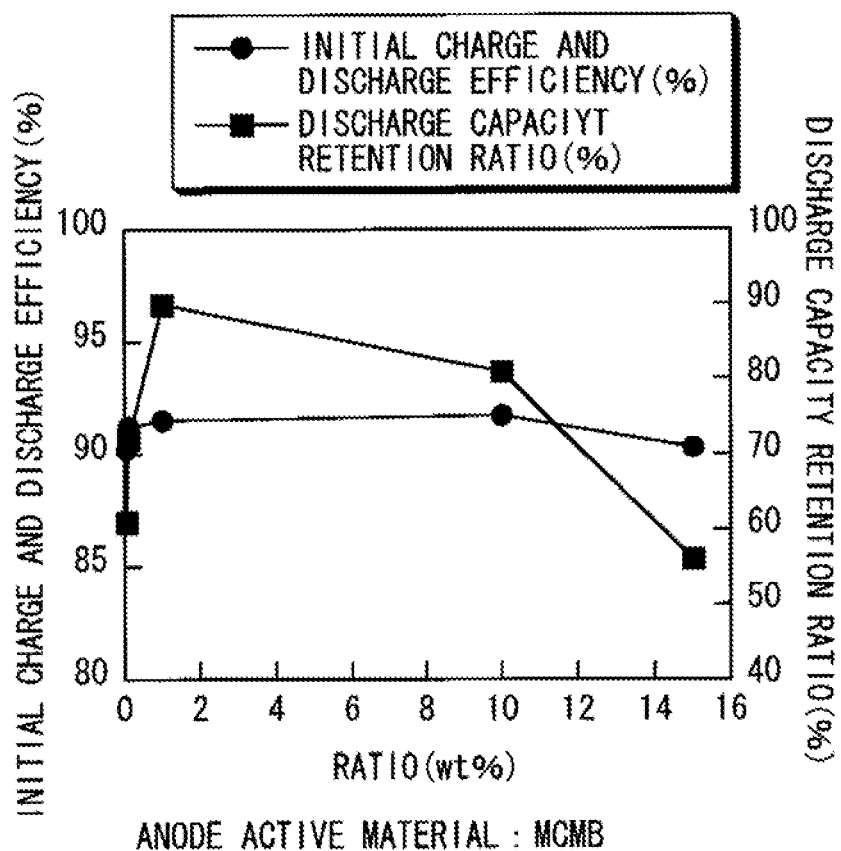
FIG. 10 is a diagram showing a correlation between a ratio of a plurality of covering particles to an anode active material and an initial charge and discharge efficiency/a discharge capacity retention ratio (anode active material: MCMB)

When the input and output characteristics and the cycle characteristics of the secondary batteries of Examples 2-1 to 2-5 and Comparative example 2 were examined, the results shown in Table 2 and FIG. 10 were obtained.

TABLE 2

| Cylindrical type | Anode active material layer | | | | | Initial charge and discharge efficiency (%) | Discharge capacity retention ratio (%) |
| --- | --- | --- | --- | --- | --- | --- | --- |
| | Anode material | | | | | | |
| | Anode active material | Covering particles | | | | | |
| | | Type | Ratio (wt %) | Thickness (μm) | Volume density (g/cm³) | | |
| Example 2-1 | MCMB | K₂CO₃ | 0.05 | 95 | 1.81 | 90.2 | 61 |
| Example 2-2 | | | 0.1 | | | 91.2 | 72 |
| Example 2-3 | | | 1 | | | 91.5 | 90 |
| Example 2-4 | | | 10 | | | 91.7 | 81 |
| Example 2-5 | | | 15 | | | 90.3 | 56 |
| Comparative example 2 | MCMB | — | — | 95 | 1.81 | 90.2 | 54 |

As shown in Table 2, in Examples 2-1 to 2-5 in which the plurality of covering particles 222 were formed, the initial charge and discharge efficiency was equal to or more than that of Comparative example 2 in which the plurality of covering particles 222 were not formed, and the discharge capacity retention ratio was higher than that of Comparative example 2. In this case, focusing attention on the ratio of the plurality of covering particles 222 to the anode active material 221, as shown in Table 2 and FIG. 10, the initial charge and discharge retention ratio was almost constant not depending on the ratio, while the discharge capacity retention ratio tended to be largely high if the ratio was in the range from 0.1 wt % to 10 wt %.

Accordingly, in the secondary battery of an embodiment, it was confirmed that the cycle characteristics were further improved if the ratio of the plurality of covering particles to the anode active material is in the range from 0.1 wt % to 10 wt %.

Examples 3-1 to 3-4

A procedure was performed in the same manner as that of Example 1-6, except that the thickness of the anode active material layer 22B was 50 μm (Example 3-1), 60 μm (Example 3-2), 120 μm (Example 3-3), or 130 μm (Example 3-4).

Comparative Examples 3-1 to 3-4

A procedure was performed in the same manner as that of Examples 3-1 to 3-4, except that the plurality of covering particles 222 were not formed.

When the input and output characteristics and the cycle characteristics of the secondary batteries of Examples 3-1 to 3-4 and Comparative examples 3-1 to 3-4 were examined, the results shown in Table 3 were obtained. "Increase in retention ratio" shown in Table 3 means an increase amount of the discharge capacity retention ratio when comparison was made between Examples 1-6, 2-3, 3-1 to 3-4 and Comparative examples 1, 2, and 3-1 to 3-4 for every same thickness of the anode active material layer 22B. The same will be applied to the after-mentioned examples.

thickness of the anode active material layer 22B, the increase in retention ratio tended to be largely increased if the thickness was in the range from 60 μm to 120 μm. The result showed the effect of the plurality of covering particles 222 on the discharge capacity retention ratio as follows. If the thickness of the anode active material layer 22B was smaller than 60 μm, the current density of the anode 22 was substantially low in charge, the transfer rate of lithium ions was fast at the interface between the anode active material layer 22B and the electrolytic solution as the rate-determining process of electrode reaction, and thus effect of forming the covering particles 222 was not sufficiently shown. Meanwhile, if the thickness of the anode active material layer 22B was larger than 120 μm, the current density of the anode 22 was excessively high in charge, and thus lithium ions were not transferred sufficiently at the foregoing interface even in the case of forming the covering particles 222. In the result, in this case, the effect of forming the covering particles 222 was not sufficiently shown. On the other hand, if the thickness of the anode active material layer 22B was in the range from 60 μm to 120 μm, even in the case that the current density of the anode 22 was high in charge, lithium ions were easily transferred due to the covering particles 222. Accordingly, in this case, the effect of forming the covering particles 222 was sufficiently shown.

Accordingly, in the secondary battery of an embodiment, it was confirmed that the input and output characteristics were also secured and the cycle characteristics were also improved in the case that the thickness of the anode active material layer was changed. In addition, it was confirmed that the cycle

TABLE 3

| Cylindrical type | Anode active material layer ||||||| |
|---|---|---|---|---|---|---|---|
| | Anode material ||| | | Initial charge and discharge efficiency (%) | Discharge capacity retention ratio (%) | Increase in retention ratio |
| | Anode active material | Covering particles ||  Thickness (μm) | Volume density (g/cm³) | | | |
| | | Type | Ratio (wt %) | | | | | |
| Example 3-1 | MCMB | K₂CO₃ | 1 | 50 | 1.81 | 91.5 | 94 | +4 |
| Example 3-2 | | | | 60 | | 91.4 | 94 | +18 |
| Example 1-6 | | | | 90 | | 91.6 | 92 | +28 |
| Example 2-3 | | | | 95 | | 91.5 | 90 | +36 |
| Example 3-3 | | | | 120 | | 91.5 | 75 | +56 |
| Example 3-4 | | | | 130 | | 91.3 | 26 | +9 |
| Comparative example 3-1 | MCMB | — | — | 50 | 1.81 | 90.3 | 90 | — |
| Comparative example 3-2 | | | | 60 | | 90.2 | 76 | — |
| Comparative example 1 | | | | 90 | | 90.2 | 64 | — |
| Comparative example 2 | | | | 95 | | 90.2 | 54 | — |
| Comparative example 3-3 | | | | 120 | | 90.2 | 19 | — |
| Comparative example 3-4 | | | | 130 | | 90 | 17 | — |

As shown in Table 3, in Examples 3-1 to 3-4 in which the plurality of covering particles 222 were formed, the initial charge and discharge efficiency and the discharge capacity retention ratio were higher compared to those of Comparative examples 3-1 to 3-4 in which the plurality of covering particles 222 were not formed.

In this case, when comparison was made between the examples and the comparative examples for every same characteristics were further improved if the thickness was in the range from 60 μm to 120 μm.

Examples 4-1 to 4-4

A procedure was performed in the same manner as that of Example 2-3, except that the volume density of the anode active material layer 22B was 1.60 g/cm³, (Example 4-1), 1.70 g/cm³ (Example 4-2), 1.95 g/cm³ (Example 4-3), or 2.00 g/cm³ (Example 4-4).

Comparative Examples 4-1 to 4-4

A procedure was performed in the same manner as that of Examples 4-1 to 4-4, except that the plurality of covering particles 222 were not formed.

When the input and output characteristics and the cycle characteristics of the secondary batteries of Examples 4-1 to 4-4 and Comparative examples 4-1 to 4-4 were examined, the results shown in Table 4 were obtained.

particles 222. In the result, in this case, the effect of forming the covering particles 222 was not sufficiently shown. On the other hand, when the volume density of the anode active material layer 22B was in the range from 1.70 g/cm³ to 1.95 g/cm³, even if the volume density was high, lithium ions were easily transferred due to the covering particles 222. Accordingly, in this case, the effect of forming the covering particles 222 was sufficiently shown.

Accordingly, in the secondary battery of an embodiment, it was confirmed that the input and output characteristics were also secured and the cycle characteristics were also improved when the volume density of the anode active material layer was changed. In addition, it was confirmed that the cycle characteristics were further improved if the volume density was in the range from 1.70 g/cm³ to 1.95 g/cm³.

TABLE 4

| Cylindrical type | Anode active material layer | | | | | Initial charge and discharge efficiency (%) | Discharge capacity retention ratio (%) | Increase in retention ratio |
|---|---|---|---|---|---|---|---|---|
| | Anode material | | | | Volume density (g/cm³) | | | |
| | Anode active material | Covering particles | | Thickness (µm) | | | | |
| | | Type | Ratio (wt %) | | | | | |
| Example 4-1 | MCMB | K₂CO₃ | 1 | 95 | 1.60 | 91.4 | 93 | +2 |
| Example 4-2 | | | | | 1.70 | 91.5 | 93 | +22 |
| Example 2-3 | | | | | 1.81 | 91.5 | 90 | +36 |
| Example 4-3 | | | | | 1.95 | 91.5 | 82 | +48 |
| Example 4-4 | | | | | 2.00 | 91.1 | 27 | +6 |
| Comparative example 4-1 | MCMB | — | — | 95 | 1.60 | 90 | 91 | — |
| Comparative example 4-2 | | | | | 1.70 | 90.2 | 71 | — |
| Comparative example 2 | | | | | 1.81 | 90.2 | 54 | — |
| Comparative example 4-3 | | | | | 1.95 | 90.1 | 34 | — |
| Comparative example 4-4 | | | | | 2.00 | 90 | 21 | — |

As shown in Table 4, in Examples 4-1 to 4-4 in which the plurality of covering particles 222 were formed, the initial charge and discharge efficiency and the discharge capacity retention ratio were higher compared to those of Comparative examples 4-1 to 4-4 in which the plurality of covering particles 222 were not formed.

In this case, when the respective increase in retention ratios were compared to each other based on the respective volume densities of the anode active material layer 22B, the increase in retention ratio tended to be largely increased if the volume density was in the range from 1.70 g/cm³ to 1.95 g/cm³. The result showed the effect of the plurality of covering particles 222 on the discharge capacity retention ratio as follows. If the volume density of the anode active material layer 22B was lower than 1.70 g/cm³, the transfer rate of lithium ions in the anode 22 in charge was fast, and the transfer rate of lithium ions was similarly fast at the interface between the anode active material layer 22B and the electrolytic solution as the rate-determining process of electrode reaction, and thus effect of forming the covering particles 222 was not sufficiently shown. Meanwhile, if the volume density of the anode active material layer 22B was higher than 1.95 g/cm³, the transfer rate of lithium ions in the anode 22 in charge was slow, and lithium ions were not transferred sufficiently at the foregoing interface even in the case of forming the covering Example 5-1

A procedure was performed in the same manner as that of Example 2-3, except that the specific surface area of the anode active material 221 was 1.5 m²/g (Example 5-1).

Examples 5-2 and 5-3

A procedure was performed in the same manner as that of Example 2-3, except that natural graphite was used instead of MCMB as the anode active material 221, and the specific surface area thereof was 2.2 m²/g (Example 5-2) or 4.1 m²/g (Example 5-3).

Comparative Examples 5-1 to 5-3

A procedure was performed in the same manner as that of Examples 5-1 to 5-3, except that the plurality of covering particles 222 were not formed.

When the input and output characteristics and the cycle characteristics of the secondary batteries of Examples 5-1 to 5-3 and Comparative examples 5-1 to 5-3 were examined, the results shown in Table 5 were obtained.

TABLE 5

| Cylindrical type | Anode active material Type | Anode active material Specific surface area (m²/g) | Covering particles Type | Covering particles Ratio (wt %) | Thickness (μm) | Volume density (g/cm³) | Initial charge and discharge efficiency (%) | Discharge capacity retention ratio (%) | Increase in retention ratio |
|---|---|---|---|---|---|---|---|---|---|
| Example 2-3 | MCMB | 0.8 | K₂CO₃ | 1 | 95 | 1.81 | 91.5 | 90 | +36 |
| Example 5-1 | | 1.5 | | | | | 91 | 89 | +38 |
| Example 5-2 | Natural graphite | 2.2 | | | | | 90.2 | 87 | +55 |
| Example 5-3 | | 4.1 | | | | | 88.4 | 87 | +58 |
| Comparative example 2 | MCMB | 0.8 | — | — | 95 | 1.81 | 90.2 | 54 | — |
| Comparative example 5-1 | | 1.5 | | | | | 89.6 | 51 | — |
| Comparative example 5-2 | Natural graphite | 2.2 | | | | | 87.8 | 32 | — |
| Comparative example 5-3 | | 4.1 | | | | | 85.2 | 29 | — |

As shown in Table 5, in Examples 5-1 to 5-3 in which the plurality of covering particles 222 were formed, the initial charge and discharge efficiency and the discharge capacity retention ratio were higher compared to those of Comparative examples 5-1 to 5-3 in which the plurality of covering particles 222 were not formed.

In this case, when the respective increase in retention ratios were compared to each other based on the type of the anode active material 221, the increase in retention ratio tended to be largely increased in the case of using the natural graphite than in the case of using MCMB. The result showed the effect of the plurality of covering particles 222 on the discharge capacity retention ratio as follows. In the case where the natural graphite having a high crystal and a narrow plane distance was used, the transfer rate of lithium ions was fast at the interface between the anode active material layer 22B and the electrolytic solution compared to the case using MCMB. Thus, in this case, when the thickness and the volume density of the anode active material layer 22B were increased, the discharge capacity retention ratio tended to be largely lowered. In this case, when the covering particles 222 were formed on the surface of the anode active material 221, the transfer rate of lithium ions became fast even if the thickness and the volume density of the anode active material layer 22B were large. Accordingly, effect of forming the covering particles 222 was sufficiently shown. Further, when the covering particles 222 existed on the surface of the anode active material 221, decomposition of the electrolytic solution was inhibited even in the case of using the natural graphite having a large specific surface area. In this case, the effect of forming the plurality of covering particles 222 was also sufficiently shown.

Accordingly, in the secondary battery of an embodiment, it was confirmed that the input and output characteristics were also secured and the cycle characteristics were also improved when the type of carbon material and the specific surface area thereof were changed in the case that the carbon material was used as an anode active material. In addition, it was confirmed that the cycle characteristics were further improved when the natural graphite was used.

Examples 6-1 to 6-8

A cylindrical type secondary battery was manufactured in the same manner as that of Examples 1-1 to 1-8 except for the following procedure.

To obtain a lithium cobalt complex oxide, a mixture of lithium carbonate and cobalt carbonate was fired at 8.90 deg C. for 5 hours. Thien, the resultant was pulverized until the particle diameter became 10 μm. To form the cathode active material layer 21B, 91 parts by weight of a mixture of the lithium cobalt complex oxide and lithium carbonate, 6 parts by weight of graphite as an electrical conductor (KS-15 manufactured by Lonza), and 3 parts by weight of polyvinylidene fluoride as a binder were mixed.

As the anode active material 221, a SnCoC-containing material as a material containing at least one of a metal element and a metalloid element was used. That is, first, as raw materials, cobalt powder, tin powder, and carbon powder were prepared. The cobalt powder and the tin powder were alloyed to obtain cobalt-tin alloy powder, to which the carbon powder was added. The resultant was dry-blended. Subsequently, 20 g of the mixture together with about 400 g of a corundum having a diameter of 9 mm were set in a reactive vessel of a planetary ball mill manufactured by Itoh Seisakujo Co., Ltd. Subsequently, inside of the reactive vessel was substituted with argon atmosphere, After that, 10-minute operation at 250 rpm and 10-minute stop were repeated until the total operation time became 30 hours. Finally, the reactive vessel was cooled down to room temperature, the synthesized SnCoC-containing material was taken out. After that, coarse grain was removed therefrom with the use of a 280-mesh sieve. When the composition of the SnCoC-containing material was analyzed, the tin content was 50 wt %, the cobalt content was 29.4 wt %, and the carbon content was 19.6 wt %. The tin content and the cobalt content were measured by Inductively Coupled Plasma (ICP) optical emission spectroscopy. The carbon content was measured by a carbon sulfur analyzer.

Figure 11:
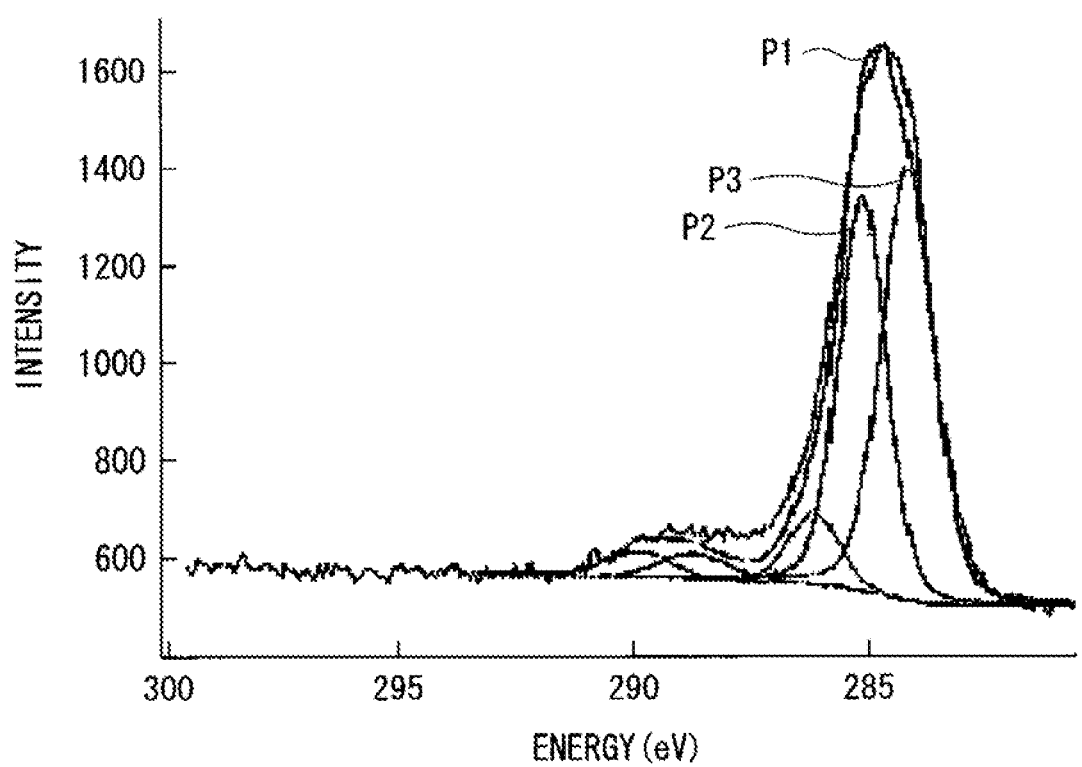
FIG. 11 is a diagram showing the analytical result of a SnCoC-containing material by XPS.

The obtained SnCoC-containing material was analyzed by X-ray diffraction method. In the result, the diffraction peak having the half bandwidth in the range of the diffraction angle 2θ=20 to 50 degrees was observed. Further, when the SnCoC-containing material was analyzed by XPS, Peak P1 was obtained as shown in FIG. 11. When Peak P1 was analyzed, Peak P2 of the surface contamination carbon and Peak P3 of C1s in the SnCoC-containing material on the energy side lower than that of Peak P2 (region lower than 284.5 eV) were obtained. That is, it was confirmed that carbon in the SnCoC-containing material was bonded to other element.

When the anode 22 was formed, 80 parts by weight of the anode active material 220 having the SnCoC-containing material as the anode active material 221, 11 parts by weight of graphite (Ronza make, KS-15) and 1 part by weight of acetylene black as an electrical conductor, and 8 parts by weight of polyvinylidene fluoride as a binder were mixed to obtain an anode mixture. After that, the mixture was dispersed in N-methyl-2-pyrrolidone as a solvent to obtain paste anode mixture slurry. After that, the both faces of the anode current collector 22A made of a strip-shaped electrolyte copper foil (thickness: 10 μm) were uniformly coated with the anode mixture slurry, which was dried and compression-molded by a rolling press machine to form the anode active material layer 22B.

When the secondary battery was assembled, the three-layer structure separator 23 in which a porous polyethylene was sandwiched between porous polypropylene (UP3015 manufactured by Ube industries Ltd., thickness: 25 μm) was used. Further, when the electrolytic solution was prepared, as a solvent, ethylene carbonate, dim ethyl carbonate, and 4-fluoro-1,3-dioxolane-2-one as a solvent were mixed at a weight ratio of 20:60:20. After that, lithium hexafluorophosphate and lithium bis(pentafluoroethanesulfonyl)imide (LiN($C_2F_5$ $SO_2$)$_2$) were dissolved therein as an electrolyte salt so that each concentration in the electrolytic solution was 0.5 mol/kg.

Comparative Example 6

A procedure was performed in the same manner as that of Examples 6-1 to 6-8, except that the plurality of covering particles 222 were not formed.

When the input and output characteristics and the cycle characteristics of the secondary batteries of Examples 6-1 to 6-8 and Comparative example 6 were examined in the same manner as that of Examples 1-1 to 1-8 and Comparative example 1, except that the discharge was performed until the discharge voltage reached 2.6 V, the results shown in Table 6 were obtained. The foregoing change of discharge voltage was similarly applied to the following examples and comparative examples.

TABLE 6

| Cylindrical type | Anode active material layer (Anode material) | | | Initial charge and discharge efficiency (%) | Discharge capacity retention ratio (%) |
|---|---|---|---|---|---|
| | Anode active material | Covering particles | | | |
| | | Type | Ratio (wt %) | | |
| Example 6-1 | SnCoC | LiCl | 1 | 86 | 91.1 |
| Example 6-2 | | NaCl | | 85 | 90.8 |
| Example 6-3 | | KCl | | 86 | 90.3 |
| Example 6-4 | | $Li_2CO_3$ | | 87 | 92.2 |
| Example 6-5 | | $Na_2CO_3$ | | 85 | 91.2 |
| Example 6-6 | | $K_2CO_3$ | | 85 | 91.4 |
| Example 6-7 | | $MgCO_3$ | | 84 | 90.8 |
| Example 6-8 | | $CaCO_3$ | | 83 | 90.4 |
| Comparative example 6 | SnCoC | — | — | 74 | 86.7 |

As shown in Table 6, in Examples 6-1 to 6-8 in which the plurality of covering particles 222 were formed, the initial charge and discharge efficiency and the discharge capacity retention ratio were higher compared to those of Comparative example 6 in which the plurality of covering particles 222 were not formed irrespective of the type of alkali metal salt and alkali earth metal salt. Accordingly, in the secondary battery of an embodiment, it was confirmed that the input and output characteristics were secured and the cycle characteristics were improved when the plurality of covering particles containing at least one of the alkali metal salt and the alkali earth metal salt were formed on the surface of the anode active material in the case that the SnCoC-containing material was used as an anode active material.

Examples 7-1 to 7-4

A procedure was performed in the same manner as that of Examples 2-1, 2-2, 2-4, and 2-5, except that the SnCoC-containing material was used as the anode active material 221 as in Examples 6-1 to 6-8.

Figure 12:
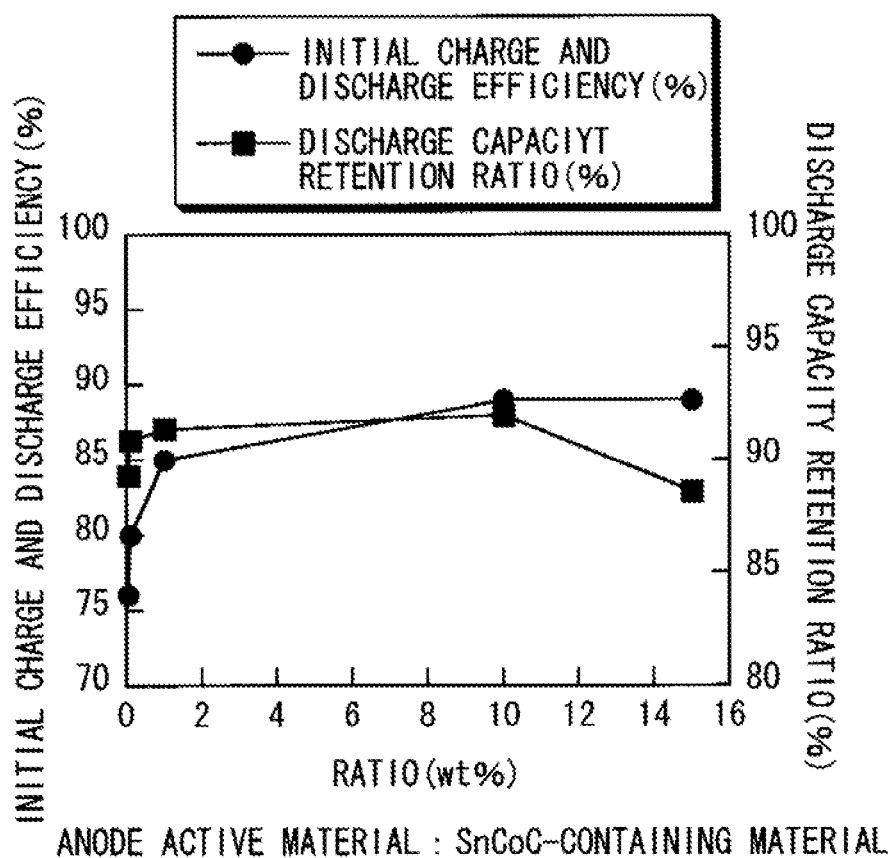
FIG. 12 is a diagram showing a correlation between a ratio of a plurality of covering particles to an anode active material and an initial charge and discharge efficiency/a discharge capacity retention ratio (anode active material: SnCoC-containing material).

When the input and output characteristics and the cycle characteristics of the secondary batteries of Examples 7-1 to 7-4 were examined, the results shown in Table 7 and FIG. 12 were obtained.

TABLE 7

| Cylindrical type | Anode active material layer (Anode material) | | | Initial charge and discharge efficiency (%) | Discharge capacity retention ratio (%) |
|---|---|---|---|---|---|
| | Anode active material | Covering particles | | | |
| | | Type | Ratio (wt %) | | |
| Example 7-1 | SnCoC | $K_2CO_3$ | 0.05 | 76 | 89.3 |
| Example 7-2 | | | 0.1 | 80 | 90.9 |
| Example 6-6 | | | 1 | 85 | 91.4 |
| Example 7-3 | | | 10 | 89 | 92 |
| Example 7-4 | | | 15 | 89 | 88.6 |
| Comparative example 6 | SnCoC | — | — | 74 | 86.7 |

As shown in Table 7, in Examples 7-1 to 7-4 in which the plurality of covering particles 222 were formed, the initial charge and discharge efficiency and the discharge capacity retention ratio were higher compared to those of Comparative example 6 in which the plurality of covering particles 222 were not formed.

In this case, as shown in Table 7 and FIG. 12, there was a tendency that the initial charge and discharge efficiency was largely high if the ratio was 0.1 wt % or more, and the discharge capacity retention ratio was largely high if the ratio was 10 wt % or less. The result shows the following fact. That is, if the ratio was 0.1 wt % or less, the number of covering particles 222 was excessively small, and thus lithium ions were not transferred at the interface between the anode active material layer 22B and the electrolytic solution. Meanwhile, if the ratio was larger than 10 wt %, the number of covering particles 222 was excessively large, and thus the discharge capacity was easily lowered.

Accordingly, in the secondary battery of an embodiment, it was confirmed that the initial charge and discharge efficiency and the cycle characteristics were further improved if the ratio of the plurality of covering particles to the anode active material was in the range from 0.1 wt % to 10 wt %.

Examples 8-1 to 8-6

A procedure was performed in the same manner as that of Example 6-6, except that SnMnC-containing material (Example 8-1), SnFeC-containing material (Example 8-2), SnNiC-containing material (Example 8-3), SnCuC-containing material (Example 8-4), SnCoB-containing material (Example 8-5), or SnCoP-containing material (Example 8-6) was used as the anode active material 221.

Comparative Examples 8-1 to 8-6

A procedure was performed in the same manner as that of Examples 8-1 to 8-6, except that the plurality of covering particles 222 were not formed.

When the input and output characteristics and the cycle characteristics of the secondary batteries of Examples 8-1 to 8-6 and Comparative examples 8-1 to 8-6 were examined, the results shown in Table 8 were obtained.

TABLE 8

| Cylindrical type | Anode active material layer (Anode material) | | | Initial charge and discharge efficiency (%) | Discharge capacity retention ratio (%) |
| --- | --- | --- | --- | --- | --- |
| | Anode active material | Covering particles | | | |
| | | Type | Ratio (wt %) | | |
| Example 8-1 | SnMnC | $K_2CO_3$ | 1 | 86 | 91.7 |
| Example 8-2 | SnFeC | | | 84 | 92.3 |
| Example 8-3 | SnNiC | | | 84 | 92.1 |
| Example 8-4 | SnCuC | | | 81 | 91.7 |
| Example 6-6 | SnCoC | | | 85 | 91.4 |
| Example 8-5 | SnCoB | | | 83 | 90.8 |
| Example 8-6 | SnCoP | | | 82 | 90.8 |
| Comparative example 8-1 | SnMnC | — | — | 77 | 87.3 |
| Comparative example 8-2 | SnFeC | | | 76 | 84.6 |
| Comparative example 8-3 | SnNiC | | | 78 | 87.7 |
| Comparative example 8-4 | SUCuC | | | 76 | 86.9 |
| Comparative example 6 | SnCoC | | | 74 | 86.7 |
| Comparative example 8-5 | SnCoB | | | 76 | 84.2 |
| Comparative example 8-6 | SnCoP | | | 71 | 84.9 |

As shown in Table 8, in Examples 8-1 to 8-6 in which the plurality of covering particles 222 were formed, the initial charge and discharge efficiency and the discharge capacity retention ratio were higher compared to those of Comparative examples 8-1 to 8-6 in which the plurality of covering particles 222 were not formed. Accordingly, in the secondary battery of an embodiment, it was confirmed that the input and output characteristics were secured and the cycle characteristics were improved even if the metal element was changed in the case that the alloy containing tin and other metal element was used as an anode active material.

Examples 9-1 and 9-2

A procedure was performed in the same manner as that of Example 6-6, except that the composition (weight ratio) of the SnCoC-containing material as the anode active material 221 was 56:33:9.9 (Example 9-1) or 43.7:25.6:29.7 (Example 9-2).

Comparative Examples 9-1 and 9-2

A procedure was performed in the same manner as that of Examples 9-1 and 9-2, except that the plurality of covering particles 222 were not formed.

When the input and output characteristics and the cycle characteristics of the secondary batteries of Examples 9-1 and 9-2 and Comparative examples 9-1 and 9-2 were examined, the results shown in Table 9 were obtained.

TABLE 9

| Cylindrical type | Anode active material layer (Anode material) | | | | Initial charge and discharge efficiency (%) | Discharge capacity retention ratio (%) |
| --- | --- | --- | --- | --- | --- | --- |
| | Anode active material | | Covering particles | | | |
| | Type | Weight ratio (Sn:Co:C) | Type | Ratio (wt %) | | |
| Example 9-1 | SnCoC | 56:33:9.9 | $K_2CO_3$ | 1 | 83 | 94.3 |
| Example 6-6 | | 50:29.4:19.6 | | | 85 | 91.4 |
| Example 9-2 | | 43.7:25.6:29.7 | | | 89 | 92 |
| Comparative example 9-1 | SnCoC | 56:33:9.9 | — | — | 71 | 88.6 |
| Comparative example 6 | | 50:29.4:19.6 | | | 74 | 86.7 |
| Comparative example 9-2 | | 43.7:25.6:29.7 | | | 75 | 82.1 |

As shown in Table 9, in Examples 9-1 and 9-2 in which the plurality of covering particles 222 were formed, the initial charge and discharge efficiency and the discharge capacity retention ratio were higher compared to those of Comparative examples 9-1 and 9-2 in which the plurality of covering particles 222 were not formed. Accordingly, in the secondary battery of an embodiment, it was confirmed that the input and output characteristics were also secured and the cycle characteristics were also improved even when the composition of the alloy containing tin was changed in the case that the alloy containing tin was used as an anode active material.

Examples 10-1 to 10-8

A procedure was performed in the same manner as that of Examples 6-1 to 6-8, except that silicon was used as the anode active material 221 instead of the SnCoC-containing material. When the anode active material 221 was formed, silicon was deposited on the both faces of the anode current collector 21A by electron beam evaporation method with the use of a deflective electron beam evaporation source.

Comparative Example 10

A procedure was performed in the same manner as that of Examples 10-1 to 10-8, except that the plurality of covering particles 222 were not formed.

When the input and output characteristics and the cycle characteristics of the secondary batteries of Examples 10-1 to 10-8 and Comparative example 10 were examined, the results shown in Table 10 were obtained.

acteristics were also improved in the case that silicon was used as an anode active material.

Examples 11-1 and 11-2

A procedure was performed in the same manner as that of Example 10-6, except that the anode active material 221 was formed by sputtering method (Example 11-1) or sintering method (Example 11-2) instead of electron beam evaporation method. When the anode active material 221 was formed by sintering method, 90 parts by weight of silicon powder as the anode active material 221 (average particle diameter: 1 μm) and 10 parts by weight of polyvinylidene fluoride as a binder were mixed to obtain an anode mixture. Then, the anode mixture was dispersed in N-methyl-2-pyrrolidone as a solvent to obtain paste anode mixture slurry. After that, the both faces of the anode current collector 22A were uniformly coated with the anode mixture slurry, and then the resultant was fired.

Example 11-3

A procedure was performed in the same manner as that of Example 10-6, except that tin was, used as the anode active material 221 instead of silicon and the anode active material 221 was formed by plating method instead of electron beam evaporation method. When the anode active material 221 was formed, tin was deposited on the both faces of the anode current collector 21A by electrolytic plating method with the use of a tin plating solution.

TABLE 10

| Cylindrical type | Anode active material layer (Anode material) | | Covering particles | | Initial charge and discharge efficiency (%) | Discharge capacity retention ratio (%) |
|---|---|---|---|---|---|---|
| | Anode active material Type | Forming method | Type | Ratio (wt %) | | |
| Example 10-1 | Si | Electron beam evaporation method | LiCl | 1 | 85 | 90.1 |
| Example 10-2 | | | NaCl | | 85 | 89.9 |
| Example 10-3 | | | KCl | | 85 | 89.8 |
| Example 10-4 | | | $Li_2CO_3$ | | 90 | 91.2 |
| Example 10-5 | | | $Na_2CO_3$ | | 86 | 89.9 |
| Example 10-6 | | | $K_2CO_3$ | | 87 | 90 |
| Example 10-7 | | | $MgCO_3$ | | 85 | 90.3 |
| Example 10-8 | | | $CaCO_3$ | | 85 | 90.1 |
| Comparative example 10 | Si | Electron beam evaporation method | — | — | 77 | 81.1 |

As shown in Table 10, in Examples 10-1 to 10-8 in which the plurality of covering particles 222 were formed, the initial charge and discharge efficiency and the discharge capacity retention ratio were higher compared to those of Comparative example 10 in which the plurality of covering particles 222 were not formed irrespective of the type of alkali metal salt and alkali earth metal salt. Accordingly, in the secondary battery of an embodiment, it was continued that the input and output characteristics were also secured and the cycle char- Comparative Examples 11-1 to 11-3

A procedure was performed in the same manner as that of Examples 11-1 to 11-3, except that the plurality of covering particles 222 were not formed.

When the input and output characteristics and the cycle characteristics of the secondary batteries of Examples 11-1 to 11-3 and Comparative examples 11-1 to 11-3 were examined, the results shown in Table 11 were obtained.

TABLE 11

| Cylindrical type | Anode active material layer (Anode material) ||||| Initial charge and discharge efficiency (%) | Discharge capacity retention ratio (%) |
| --- | --- | --- | --- | --- | --- | --- |
| | Anode active material || Covering particles ||||
| | Type | Forming method | Type | Ratio (wt %) | | |
| Example 10-6 | Si | Electron beam evaporation method | $K_2CO_3$ | 1 | 87 | 90 |
| Example 11-1 | | Sputtering method | | | 88 | 89.6 |
| Example 11-2 | | Sintering method | | | 82 | 90.2 |
| Example 11-3 | Sn | Plating method | | | 80 | 88.8 |
| Comparative example 10 | Si | Electron beam evaporation method | — | — | 77 | 81.1 |
| Comparative example 11-1 | | Sputtering method | | | 78 | 80.2 |
| Comparative example 11-2 | | Sintering method | | | 71 | 83.1 |
| Comparative example 11-3 | Sn | Plating method | | | 68 | 83.6 |

As shown in Table 11, in Examples 11-1 to 11-3 in which the plurality of covering particles 222 were formed, the initial charge and discharge efficiency and the discharge capacity retention ratio were higher compared to those of Comparative examples 11-1 to 11-3 in which the plurality of covering particles 222 were not formed. Accordingly, in the secondary battery of an embodiment, it was confirmed that the input and output characteristics were also secured and the cycle characteristics were also improved when tin was used as an anode active material or when the forming method was changed in the case that silicon or tin was used as an anode active material.

Example 12-1

A procedure was performed in the same manner as that of Example 6-6, except that the laminated film type secondary battery shown in FIG. 6 to FIG. 8 was manufactured by the following procedure.

When the secondary battery was manufactured, first, the cathode 33 was formed by forming the cathode active material layer 33B on the both faces of the cathode current collector 33A, and the anode 34 is formed by forming the anode active material layer 34B on the both faces of the anode current collector 34A. As an electrical conductor of the anode active material layer 34B, graphite (mesophase spherule/spherocrystal graphite manufactured by JFE Steel Corporation) was used. Subsequently, copolymer of vinylidene fluoride and hexafluoropropylene was prepared as a polymer compound. After that, a precursor solution was prepared by mixing the polymer compound, an electrolytic solution, and a mixed solvent. As the composition of the polymer compound, a component having a weight-average molecular weight of 0.7 million and a component having a weight-average molecular weight of 0.31 million were mixed at a weight ratio of 9:1, and the ratio of hexafluoropropylene in the copolymer was 7 wt %. Subsequently, the both faces of the cathode 33 and the anode 34 were coated with the precursor solution by using a bar coater, the mixed solvent was volatilized to form the gel electrolyte layer 36. Subsequently, the cathode lead 31 made of aluminum was attached to one end of the cathode current collector 33A by welding, and the anode lead 32 made of nickel was attached to one end of the anode current collector 34A by welding. Subsequently, the cathode 33, the separator 35 made of polyethylene (E16MMS manufactured by Tonen Chemical Corporation, thickness: 16 μm), the anode 34, and the foregoing separator 35 were layered in this order, and the resultant laminated body was spirally wound in the longitudinal direction. The end of the spirally wound body was fixed with the use of the protective tape 37 made of an adhesive tape to form the spirally wound electrode body 30. Finally, the spirally wound electrode body 30 was enclosed into the package member 40 made of a the layer laminated film (total thickness: 100 μm in which nylon (thickness: 30 μm), aluminum (thickness: 40 μm), and cast polypropylene (thickness: 30 μm) were layered from the outside under reduced pressure. Accordingly, the laminated film type secondary battery was fabricated.

Examples 12-2 and 12-3

A procedure was performed in the same manner as that of Examples 10-6 and 11-1, except that the laminated film type secondary battery was manufactured as in Example 12-1.

Comparative Examples 12-1 to 12-3

A procedure was performed in the same manner as that of Examples 12-1 to 12-3, except that the plurality of covering particles 222 were not formed.

When the input and output characteristics and the cycle characteristics of the secondary batteries of Examples 12-1 to 12-3 and Comparative examples 12-1 to 12-3 were examined, the results shown in Table 12 were obtained.

TABLE 12

| Laminated film type | Anode active material layer (Anode material) | | | | Initial charge and discharge efficiency (%) | Discharge capacity retention ratio (%) |
| --- | --- | --- | --- | --- | --- | --- |
| | Anode active material | | Covering particles | | | |
| | Type | Forming method | Type | Ratio (wt %) | | |
| Example 12-1 | SnCoC | Coating method | K$_2$CO$_3$ | 1 | 83 | 94.7 |
| Example 12-2 | Si | Electron beam evaporation method | | | 85 | 90.2 |
| Example 12-3 | | Sputtering method | | | 85 | 91.3 |
| Comparative example 12-1 | SnCoC | Coating method | — | — | 71 | 89.7 |
| Comparative example 12-2 | Si | Electron beam evaporation method | | | 75 | 86.3 |
| Comparative example 12-3 | | Sputtering method | | | 74 | 88.7 |

As shown in Table 12, in Examples 12-1 to 12-3 in which the plurality of covering particles 222 were formed, the initial charge and discharge efficiency and the discharge capacity retention ratio were higher compared to those of Comparative examples 12-1 to 12-3 in which the plurality of covering particles 222 were not formed. Accordingly, in the secondary battery of an embodiment, it was confirmed that the input and output characteristics were also secured and the cycle characteristics were also improved when the battery structure was changed in the case that the SnCoC-containing material or silicon was used as an anode active material.

As evidenced by the results of the foregoing Table 1 to Table 12 and FIG. 10 and FIG. 12, in the secondary battery of an embodiment, it was confirmed that the input and output characteristics were secured and the cycle characteristics were improved irrespective of the type, the composition, the forming method, the battery structure and the like of the anode active material when the plurality of covering particles containing at least one of the alkali metal salt and the alkali earth metal salt were formed on the surface of the anode active material in the case that the carbon material or the material containing at least one of the metal element and the metalloid element was contained as an anode active material capable of intercalating and deintercalating the electrode reactant.

The present application has been described with reference to the embodiments and the examples. However, the present application is not Limited to the aspects described in the foregoing embodiments and the foregoing examples, and various modifications may be made. For example, the anode material and the anode of the present application are not necessarily used for the battery, but may be used for an electrochemical device other than the battery. As other application, for example, a capacitor or the like is cited.

Further, in the foregoing embodiments and the foregoing examples, the descriptions have been given of the case using the electrolytic solution or the gel electrolyte in which the electrolytic solution is held by the polymer compound as an electrolyte. However, other type of electrolyte may be used. As other type of electrolyte, for example, a mixture obtained by mixing an ion conductive inorganic compound such as ion conductive ceramics, ion conductive glass, and ionic crystal and an electrolytic solution; a mixture obtained by mixing other inorganic compound and an electrolytic solution; a mixture of the foregoing inorganic compound and a gel electrolyte or the like is cited.

Further, in the foregoing embodiments and the foregoing examples, the descriptions have been given of the lithium ion secondary battery in which the anode capacity is expressed-based on intercalation and deintercalation of lithium as a battery type. However, the battery of the present application is not limited thereto. The present application is similarly applicable to a secondary battery in which the anode capacity includes the capacity by intercalation and deintercalation of lithium and the capacity by precipitation and dissolution of lithium, and the anode capacity is expressed as the sum of these capacities, by setting the charge capacity of the anode active material capable of intercalating and deintercalating lithium to a smaller value than that of the charge capacity of the cathode active material.

Further, in the foregoing embodiments and the foregoing examples, the descriptions have been given with the specific examples of the secondary batteries having a battery structure of cylindrical type and laminated film type, and with the specific example of the battery in which the battery element has the spirally wound structure. However, the present application is similarly applicable to a battery having other structure such as a square type battery, a coin type battery, and a button type battery, or a battery in which the battery element has other structure such as a lamination structure. The battery of the present application is similarly applicable to other type of battery such as a primary battery in addition to the secondary battery.

Further, in the foregoing embodiments and the foregoing examples, the description has been given of the case using lithium as an electrode reactant. However, as an electrode reactant, other Group 1A element such as sodium and potassium, a Group 2A element such as magnesium and calcium, or other light metal such as aluminum may be used. In these cases, the material described in the foregoing embodiments may be used as an anode active material as well.

Further, in the foregoing embodiments and the foregoing examples, for the ratio of the plurality of covering particles to the anode active material in the anode material, the anode or the battery of an embodiment, the numerical value range thereof derived from the results of the examples has been described as the appropriate range. However, such a description does not totally eliminate the possibility that the ratio may be out of the foregoing range. That is, the foregoing desirable appropriate range is the range particularly preferable for obtaining the effects of the present application. Therefore, as long as effects may be obtained, the ratio may be out of the foregoing range in some degrees. The same is applied to the thickness, the volume density and the like of the anode active material layer in addition to the foregoing ratio.

It should be understood that various changes and modifications to the presently preferred embodiments described herein will be apparent to those skilled in the art, such changes and modifications can be made without departing from the spirit and scope of the present subject matter and without diminishing its intended advantages. It is therefore intended that such changes and modifications be covered by the appended claims.

The invention is claimed as follows:

1. An anode material comprising:
an anode active material including a carbon material;
a plurality of covering particles on a surface of the anode active material capable of intercalating and deintercalating an electrode reactant,
wherein the plurality of covering particles contain at least one of an alkali metal salt and an alkali earth metal salt,
wherein the alkali metal salt is selected from the group consisting of a chloride salt, a hydrosulfate, and mixtures thereof,
wherein the alkali earth metal salt is selected from the group consisting of a chloride salt, a carbonate, a hydrosulfate, and mixtures thereof, and
wherein the plurality of covering particles cover less than all of the surface of the anode active material and the at least one of an alkali metal salt and an alkali earth metal salt exists on the surface of the anode active material before an initial charge.

2. The anode material according to claim 1, wherein the plurality of covering particles cover at least part of the surface of the anode active material in a state of a film.

3. The anode material according to claim 1, wherein the alkali metal salt is at least one selected from the group consisting of lithium chloride, sodium chloride, potassium chloride, lithium sulfate, sodium sulfate, potassium sulfate, and mixtures thereof, and
the alkali earth metal salt is at least one of magnesium carbonate, calcium carbonate, and mixtures thereof.

4. The anode material according to claim 1, wherein a ratio of the plurality of covering particles to the anode active material is in the range from 0.1 wt % to 10 wt %.

5. The anode material according to claim 1, wherein the carbon material is natural graphite.

6. The anode material according to claim 1, wherein the anode active material contains a material containing at least one of a metal element and a metalloid element.

7. The anode material according to claim 6, wherein the material containing at least one of the metal element and the metalloid element is at least one selected from the group consisting of a simple substance of silicon, an alloy of silicon, a compound of silicon, a simple substance of tin, an alloy of tin, and a compound of tin.

8. The anode material according to claim 6, wherein the material containing at least one of the metal element and the metalloid element is a material containing
tin as a first element,
at least one selected from the group consisting of cobalt, iron, magnesium, titanium, vanadium, chromium, manganese, nickel, copper, zinc, gallium, zirconium, niobium, molybdenum, silver, indium, cerium, hafnium, tantalum, tungsten, bismuth, and silicon as a second element, and
at least one selected from the group consisting of boron, carbon, aluminum, and phosphorus as a third element.

9. An anode comprising:
an anode active material layer on an anode current collector,
wherein the anode active material layer contains an anode material having a plurality of covering particles on a surface of an anode active material capable of intercalating and deintercalating an electrode reactant,
the anode active material includes a carbon material,
the plurality of covering particles contain at least one of an alkali metal salt and an alkali earth metal salt,
the alkali metal salt is selected from the group consisting of a chloride salt, a hydrosulfate, and mixtures thereof,
the alkali earth metal salt is selected from the group consisting of a chloride salt, a carbonate, a hydrosulfate, and mixtures thereof, and
the plurality of covering particles cover less than all of the surface of the anode active material and the at least one of an alkali metal salt and an alkali earth metal salt exists on the surface of the anode active material before an initial charge.

10. The anode according to claim 9, wherein the plurality of covering particles cover at least part of the surface of the anode active material in a film state.

11. The anode according to claim 9, wherein the alkali metal salt is at least one selected from the group consisting of lithium chloride, sodium chloride, potassium chloride, lithium sulfate, sodium sulfate, potassium sulfate, and mixtures thereof, and
the alkali earth metal salt is at least one of magnesium carbonate, calcium carbonate, and mixtures thereof.

12. The anode according to claim 9, wherein a ratio of the plurality of covering particles to the anode active material is in the range from 0.1 wt % to 10 wt %.

13. The anode according to claim 9, wherein the carbon material is natural graphite.

14. The anode according to claim 9, wherein a thickness of the anode active material layer is in the range from 60 μm to 120 μm.

15. The anode according to claim 9, wherein a volume density of the anode active material layer is in the range from 1.70 g/cm$^3$ to 1.95 g/cm$^3$.

16. The anode according to claim 9, wherein the anode active material contains a material containing at least one of a metal element and a metalloid element.

17. The anode according to claim 16, wherein the material containing at least one of the metal element and the metalloid element is at least one selected from the group consisting of a simple substance of silicon, an alloy of silicon, a compound of silicon, a simple substance of tin, an alloy of tin, and a compound of tin.

18. The anode according to claim 16, wherein the material containing at least one of the metal element and the metalloid element is a material containing
tin as a first element,
at least one selected from the group consisting of cobalt, iron, magnesium, titanium, vanadium, chromium, manganese, nickel, copper, zinc, gallium, zirconium, niobium, molybdenum, silver, indium, cerium, hafnium, tantalum, tungsten, bismuth, and silicon as a second element, and at least one selected from the group consisting of boron, carbon, aluminum, and phosphorus as a third element.

19. A battery comprising:
a cathode;
an anode; and
an electrolytic solution,
wherein the anode has an anode active material layer on an anode current collector,
the anode active material layer contains an anode material having a plurality of covering particles on a surface of an anode active material capable of intercalating and deintercalating an electrode reactant,
the anode active material includes a carbon material,
the plurality of covering particles contain at least one of an alkali metal salt and an alkali earth metal salt,
the alkali metal salt is selected from the group consisting of a chloride salt, a hydrosulfate, and mixtures thereof,
the alkali earth metal salt is selected from the group consisting of a chloride salt, a carbonate, a hydrosulfate, and mixtures thereof, and
the plurality of covering particles cover less than all of the surface of the anode active material and the at least one of an alkali metal salt and an alkali earth metal salt exists on the surface of the anode active material before an initial charge.

20. The battery according to claim 19, wherein the plurality of covering particles cover at least part of the surface of the anode active material in a film state.

21. The battery according to claim 19, wherein the alkali metal salt is at least one selected from the group consisting of lithium chloride, sodium chloride, potassium chloride, lithium sulfate, sodium sulfate, potassium sulfate, and mixtures thereof, and
the alkali earth metal salt is at least one of magnesium carbonate, calcium carbonate, and mixtures thereof.

22. The battery according to claim 19, wherein a ratio of the plurality of covering particles to the anode active material is in the range from 0.1 wt % to 10 wt %.

23. The battery according to claim 19, wherein the anode material has a coat covering the plurality of covering particles, and forming a stable interface that has conductivity of electrode reactant ions but does not have conductivity of electrons between the anode and the electrolytic solution.

24. The battery according to claim 19, wherein the carbon material is natural graphite.

25. The battery according to claim 19, wherein a thickness of the anode active material layer is in the range from 60 μm to 120 μm.

26. The battery according to claim 19, wherein a volume density of the anode active material layer is in the range from 1.70 g/cm$^3$ to 1.95 g/cm$^3$.

27. The battery according to claim 19, wherein the anode active material contains a material containing at least one of a metal element and a metalloid element.

28. The battery according to claim 27, wherein the material containing at least one of the metal element and the metalloid element is at least one selected from the group consisting of a simple substance of silicon, an alloy of silicon, a compound of silicon, a simple substance of tin, an alloy of tin, and a compound of tin.

29. The battery according to claim 27, wherein the material containing at least one of the metal element and the metalloid element is a material containing
tin as a first element,
at least one selected from the group consisting of cobalt, iron, magnesium, titanium, vanadium, chromium, manganese, nickel, copper, zinc, gallium, zirconium, niobium, molybdenum, silver, indium, cerium, hafnium, tantalum, tungsten, bismuth, and silicon as a second element, and
at least one selected from the group consisting of boron, carbon, aluminum, and phosphorus as a third element.

30. The battery according to claim 27, wherein the material containing at least one of the metal element and the metalloid element is a material containing SnCoC, wherein the carbon content of the material is 9.9 wt % to 29.7 wt %, and wherein a ratio of the amount of cobalt to the total amount of tin and cobalt in the material is 30 wt % to 70 wt %.

31. The battery according to claim 30, wherein the material includes a phase containing tin, cobalt and carbon.

32. The anode material according to claim 1, wherein the plurality of covering particles are formed on the surface of the anode active material regardless of any charge.

33. An anode material comprising:
a plurality of covering particles on a surface of an anode active material capable of intercalating and deintercalating an electrode reactant, the plurality of covering particles covering less than all of the surface of the anode active material before an initial charge, and the anode active material including a carbon material; and
a coat covering the plurality of covering particles,
wherein the plurality of covering particles contain at least one of an alkali metal salt and an alkali earth metal salt,
wherein the alkali metal salt is selected from the group consisting of a chloride salt, a hydrosulfate, and mixtures thereof, and
wherein the alkali earth metal salt is selected from the group consisting of a chloride salt, a carbonate, a hydrosulfate, and mixtures thereof.

34. The anode material according to claim 33, wherein the coat covering the plurality of covering particles is formed by reaction between the anode material and an electrolytic solution during the initial charge.

* * * * *